(12) United States Patent
Forest

(10) Patent No.: US 8,303,311 B2
(45) Date of Patent: Nov. 6, 2012

(54) SPORT PERSONAL COACH SYSTEM

(76) Inventor: Carl A. Forest, Boulder, CO (US)

( * ) Notice: Subject to any disclaimer, the term of this patent is extended or adjusted under 35 U.S.C. 154(b) by 362 days.

(21) Appl. No.: 12/580,902

(22) Filed: Oct. 16, 2009

(65) Prior Publication Data
US 2011/0076657 A1    Mar. 31, 2011

Related U.S. Application Data

(60) Provisional application No. 61/247,430, filed on Sep. 30, 2009.

(51) Int. Cl.
G06F 17/00 (2006.01)
A63B 69/36 (2006.01)

(52) U.S. Cl. ......... 434/252; 473/407; 473/409; 473/131

(58) Field of Classification Search .................. 434/252; 473/131, 407, 409
See application file for complete search history.

(56) References Cited

U.S. PATENT DOCUMENTS

| | | | | |
|---|---|---|---|---|
| 5,294,110 A * | 3/1994 | Jenkins et al. | ................ | 473/407 |
| 5,364,093 A | 11/1994 | Huston et al. | | |
| 5,427,370 A * | 6/1995 | Hamblin et al. | ............ | 473/238 |
| 5,438,518 A | 8/1995 | Bianco et al. | | |
| 5,507,485 A | 4/1996 | Fisher | | |
| 5,591,088 A * | 1/1997 | Bianco et al. | ................ | 473/131 |
| 5,685,786 A | 11/1997 | Dudley | | |
| 5,810,680 A * | 9/1998 | Lobb et al. | .................... | 473/407 |
| 6,456,938 B1 * | 9/2002 | Barnard | ....................... | 701/454 |
| 6,517,353 B1 * | 2/2003 | Jones | ........................... | 434/252 |
| 6,757,572 B1 * | 6/2004 | Forest | ............................ | 700/90 |
| 6,931,290 B2 | 8/2005 | Forest | | |
| 7,121,962 B2 * | 10/2006 | Reeves | ........................ | 473/407 |
| 2005/0037872 A1 * | 2/2005 | Fredlund et al. | ............. | 473/407 |
| 2005/0227791 A1 * | 10/2005 | McCreary et al. | ............ | 473/407 |
| 2007/0111767 A1 * | 5/2007 | Brown et al. | .................... | 463/1 |

OTHER PUBLICATIONS http://en.wikipedia.org/wiki/Caddy.
http://www.amperordirect.com/c/c-amperorvoip/index.html.
http://www.asterisk.org/.
http://www.google.com/gizmo5/.
http://www.prettymay.net/.
http://www.skype.com/.
http://www.skype.com/allfeatures/callphones/.

* cited by examiner

Primary Examiner — Julie Brocketti
(74) Attorney, Agent, or Firm — Patton Boggs LLP

(57) ABSTRACT

A call center system for coaching a player in judgmental aspects of an athletic sport or for practicing judgmental aspects of the sport includes a call center computer having a display and a memory. The system may also include a camera, a telephone, and a position locator system. Either the pictures stored in the memory or pictures taken with the camera are used to provide coaching or practice. Pictures of a golf course, golf course mapping data, or both are stored in a call center system. GPS data indicating the position of a golf ball on a golf course hole is used to provide either an overhead view of the hole and terrain features, pictures of the course at or near the location of the ball, or both, on a golf professional computer display.

8 Claims, 17 Drawing Sheets

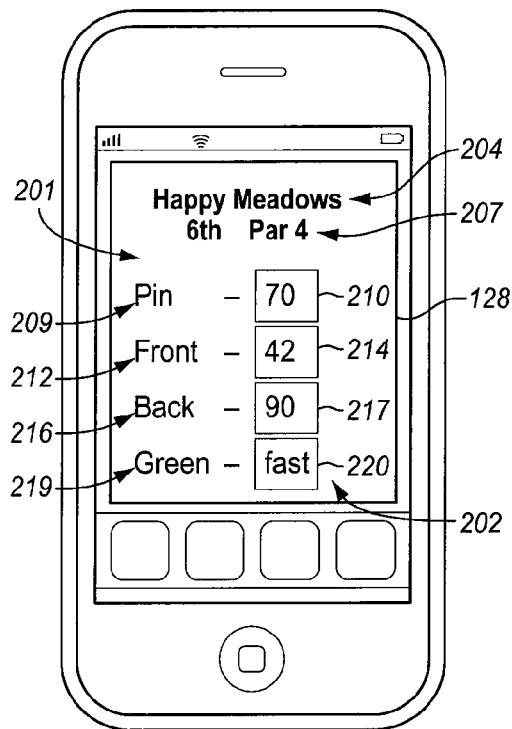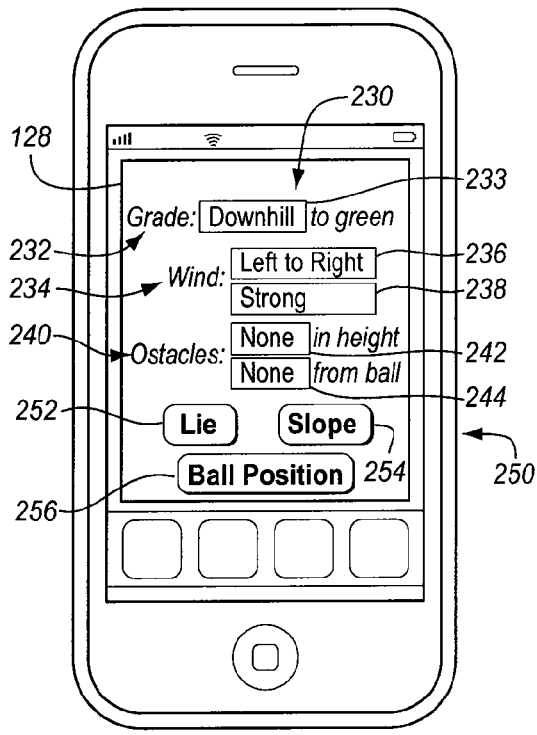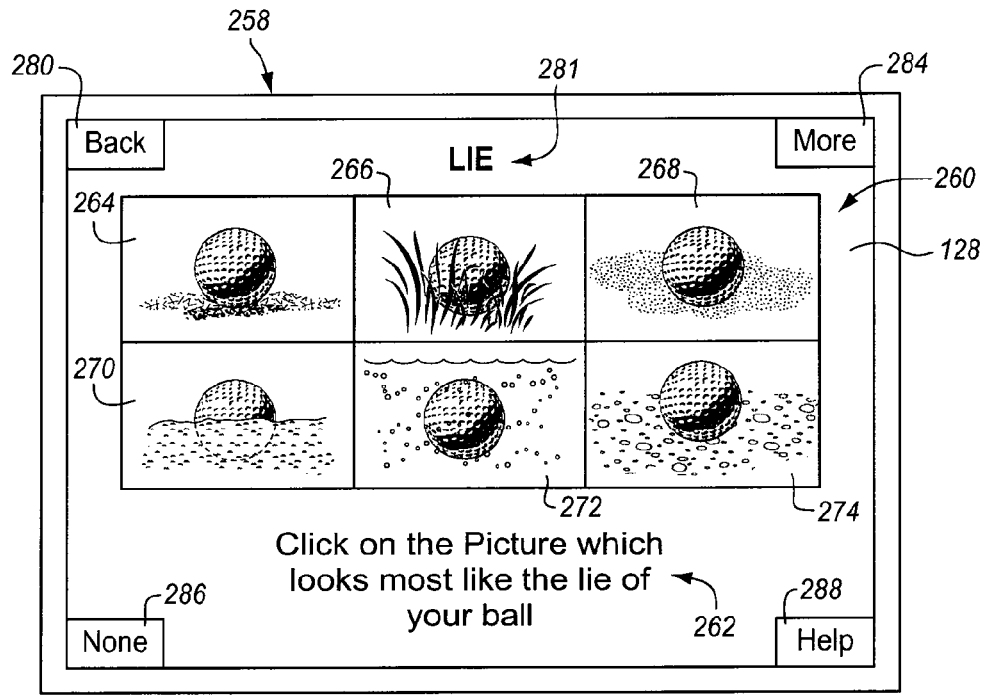
FIG. 2
FIG. 3
FIG. 4

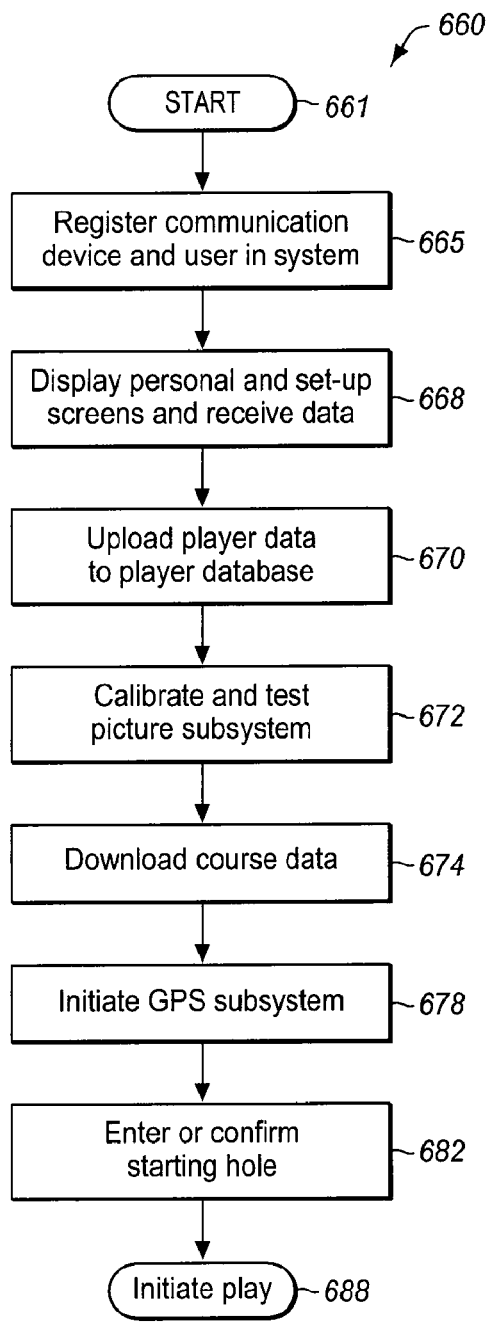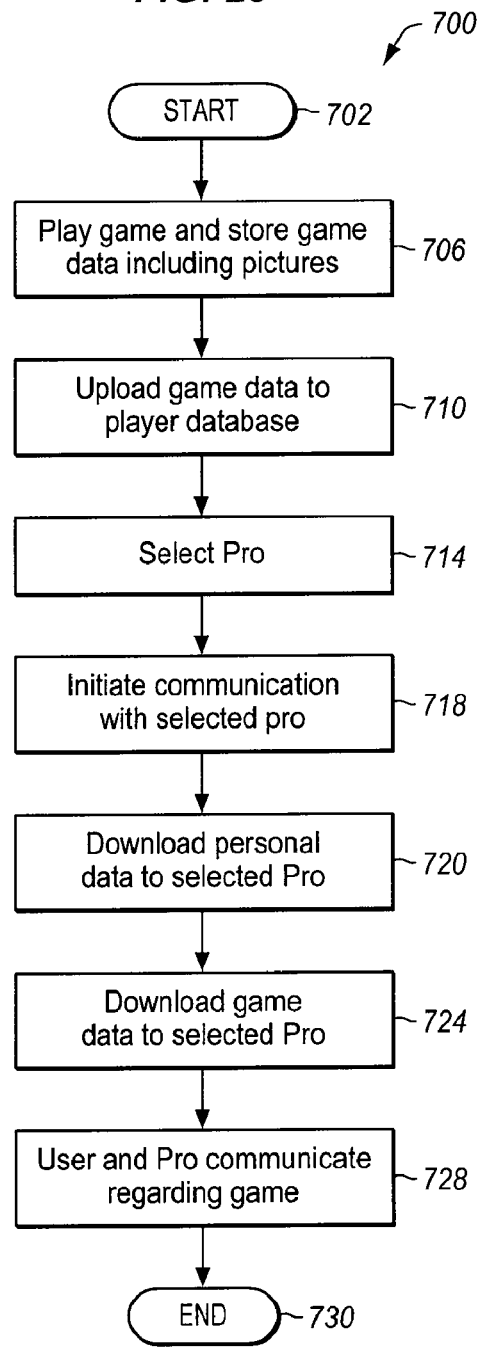

SPORT PERSONAL COACH SYSTEM

CROSS-REFERENCE TO RELATED APPLICATIONS

This Application claims the benefit of U.S. Provisional Application 61/247,430 filed on Sep. 30, 2009.

BACKGROUND OF THE INVENTION

1. Field of the Invention

The invention relates generally to the field of electronic personal coaches that assist individuals in learning and playing a sport, and more particularly to the information exchange aspect of such a personal coaching system.

2. Statement of the Problem

U.S. Pat. No. 6,931,290 issued Aug. 16, 2005 to Carl A. Forest and U.S. Pat. No. 6,757,572 issued Jun. 29, 2004 to the same inventor, disclose a computerized system and method for practicing and instructing in a sport. These patents explain a sport personal coaching system and method using the game of golf as an example. In the disclosed system, the user enters into a client computer a plurality of discrete physical factors describing a real or hypothetical situation in the sport. For example, a player on a golf course has the ability to enter information concerning the distance to the pin, or the green, the grade to the green, the condition of the green, e.g., fast or slow, obstacles between the ball and the green, the terrain in which the ball is located, the lie of the ball, the slope on which the ball lies, the position of the golfer with respect to the ball, and the environmental conditions, such as wind. To do this the user selects one of a variety of alternatives from a pull down menu. For example, the user can select the type of lie by selecting one of the following from a pull down menu: divot, embedded, hard, soft etc. Alternatively, at least some of the discrete physical factors can be automatically entered. For example, a geophysical position system (GPS) can be used to locate the ball position on the course and provide the distance to the pin. After the discrete physical factors have been entered, the system then assists the player in choosing the appropriate actions to take in response to the physical situation, e.g., the proper club, the proper shot, the proper grip, the proper stance, the proper swing, etc. The user can also use the system in practicing the judgmental aspects of a sport, for example on a home personal computer. The user can purchase packages in which the instructions are those of a particular expert, such as a particular golf professional. In this manner, the user gets personal coaching on a particular physical golfing situation.

In another embodiment, of the system of the above-identified patents, a user can obtain real-time assistance from golf professional. In this embodiment, the discrete physical factors input into the client system are transmitted in real time to a computer accessible to golf professional where the golf professional can view them on a display. The golf professional then can communicate the appropriate actions to the user. The user and the professional can also talk to each other, with the professional providing comments and instructions on the user's play.

The system of the U.S. Pat. Nos. 6,931,290 and 6,757,572 is highly useful and a significant advance that is not provided by any other known sports coaching system. However, these systems have not yet become commercially successful and adapted by the golfing community. In actual play, the exchange of data between the user and the system, and the user and the professional can often slow up play on a golf course. To accurately describe an actual golfing physical situation in detail, a lot of data has to be uploaded to the system of the '290 and '572 patents. Further, words such as "hard" or "soft" have different meanings to different people, and players sometimes are indecisive about selecting descriptions from the pull down menus. Further, the inherent ambiguity in such terms leads to inaccuracies in the coaching. This prevents the system from being as useful as it could be on the golf course, as the user can be rushed, or decide not to use the system because the user has been asked to speed up his or her game. In sports other than golf, such as rock climbing, this can be an even more significant problem because the constraints of the sport can require prompt, decisive action. Even in the practice mode, the input of data and the providing of instructions as described in the U.S. Pat. Nos. 6,931,290 and 6,757,572 can slow the practice, or at times create ambiguity that hinders learning. Thus, it would be highly desirable to have a method and apparatus for exchanging input data and instructions in an electronic personal sport coaching system that was faster, less ambiguous, more intuitive and thus more acceptable to the average sports player.

SUMMARY OF THE INVENTION

This application discloses a number of improvements to the disclosure of the U.S. Pat. Nos. 6,931,290 (the '290 patent) and 6,757,572 (the '572 patent) mentioned above. This application also discloses improvements to golf range finder systems such as disclosed in U.S. Pat. No. 5,364,093 issued Nov. 15, 1994 to Charles D. Huston et al, U.S. Pat. No. 5,507,485 issued Apr. 16, 1996 to Donald Fisher, and U.S. Pat. No. 5,685,786 issued Nov. 11, 1997 to Douglas P. Dudley. The disclosure of all five of the above patents is hereby incorporated by reference to the same extent as though fully disclosed herein.

An object of the invention is to level the playing field between the average player of a sport such as golf and the richer players and professionals. Professional golfers and people with enough money have caddies that accompany them on the golf course. Such caddies provide assistance in all the judgmental aspects of golf. For example, they will provide assistance in adjusting to the slope of the course, the condition of the course, and suggestions on shots of all types. Wikepedia, for example, defines a caddy as "the person who carries a player's bag, and gives insightful advice and moral support. A good caddy is aware of the challenges and obstacles of the golf course being played, along with the best strategy in playing it. This includes knowing overall yardage, pin placements and club selection." (http://en.wikipedia.org/wiki/Caddy) As recognized in this article, a significant part of the moral support is giving the player confidence in knowing that the various judgmental decisions are sound. People with little money are definitely at a disadvantage under current golf practices.

The invention solves the above problems, as well as other problems of the prior art, and obtains the objects of the inventor, by providing a sport call center that provides real-time coaching to a player of a sport from a location remote from the player. Preferably, the system is transparent to the player. That is, the player only needs to telephone the call center and the call center does the rest. That is, the call center connects the player to a coach and the coach already knows all the essentials of what the player needs coaching about. For example, if the sport is golf, a player may be presented with a shot about which the player wants coaching. The player pulls out a cell phone, presses a button that connects the player to the call center, a golf professional comes on the line, and the professional is immediately able to coach the player on the shot. The system is able to accomplish this because it already includes a large variety of information about the terrain of the golf course as a function of the location coordinates. When the player telephones the call center, the location coordinates, preferably determined by a GPS system, are automatically uploaded to the call center. The call center only needs to pull up the stored information about the course, and it is able to present to the professional the position of the ball, the terrain at the position of the ball, the distance to the green, the pin, and other hazards. Preferably, the system also has available a large amount of information about the player in a player database. The call center system is able to present this information about the player to the professional prior to any discussion with the player because the player's identification is preferably also automatically uploaded to the call center along with the location coordinates. The call center only needs to use the player ID to retrieve the player information and transmit it to the professional for the professional to have detailed knowledge of the player's abilities. Preferably, even the speed of the green and the local weather are available to the professional before the professional exchanges a word with the player. The system is able to do this because it includes a terrain mapper and course database that stores all information that has been previously entered into the system. As we shall see below, the system according to the invention has a large variety of ways to acquire detailed information about the course and the player.

The invention solves the above problems, as well as other problems of the prior art, by providing a method and system of communicating the discrete physical factors and the coaching that is more direct and has less chance of being misunderstood. In one embodiment of the system, instead of asking the user to input data by selecting words or descriptions, the system presents a variety of pictures of possible physical situations, and the user may select the picture that is closest to the actual physical situation. In this embodiment, the picture presentation is preferably iterative. That is, when the user selects the picture that is closest to the physical situation, the system provides a second layer of pictures, each picture differing a small amount from the first selected picture, giving the user an opportunity to more narrowly define the physical situation. We have found that the average user can much more quickly respond to pictures than to descriptions in words, whether printed or spoken. Moreover, since the system knows precisely the physical situation the picture depicts, there is significantly less ambiguity in the communication, and the coaching that results is more accurate. In fact, it has been found that the pictures according to the invention have less inherent ambiguity than even talking to a professional. The communication of the physical situation by the user can be either to a system that automatically provides coaching, or to a golf professional. The pictures selected by the player are preferably stored in the course database and associated with the location coordinates or the ball position at which the pictures were selected.

In another embodiment, the user communicates with the system and/or the professional, by taking one or more pictures of the ball and its location and inputting them into the system and communicating them to the system and/or the professional. Preferably, the one or more pictures include one or more close-ups of the ball, and more preferably, a plurality of close-up pictures, each picture showing the position of the ball from a different perspective. The terrain mapper also stores these pictures in the course database in association with the position coordinates.

In another embodiment, the user communicates with the system and/or the golf professional by sending the position coordinates of the ball. The system and/or the golf professional computer has a detailed mapping of the course, which may include course layouts similar to those in a conventional golf range finder, pictures of the course previously taken at or near the location of the ball, and other information about the course terrain in the vicinity of the ball, such as the pictures which a previous user has selected as being closest to the terrain in the vicinity of the ball. In this embodiment, preferably, a picture of the current ball physical situation may also be sent to the professional. The picture may be one selected by the user from a set of pictures, or it may be a photograph of the ball, or both.

It has been found that, if the system or professional have an electronic map of the course available in the system memory, pictures of the course available in the system memory, or both, the physical situation that the golfer faces on a course can be completely communicated to a professional simply by communicating the location coordinates of the ball. Preferably, a close-up picture of the physical situation may also be also taken and sent to the system and/or the professional. The terrain mapper and the course database greatly reduce the amount of information that must be sent to the professional and the time it takes to fully inform the professional of the physical situation.

It has been found that the use of pictures for communicating even is useful in the practice mode of the system of the invention. It makes the practice faster and more meaningful, and more like a real golf situation. This is particularly true for close up pictures.

The invention provides a method for coaching a player in judgmental aspects of golf or for practicing the judgmental aspects of golf, the method comprising: providing a client computer having a first display; displaying a plurality of pictures on the first display, each of the pictures showing a different physical situation of a golf ball that may occur in golf; receiving an input indicating that the player has selected one of the pictures to describe a golf ball physical situation with respect to which the player wants coaching; receiving additional inputs describing the golf ball physical situation, including distance information, sufficient to provide coaching related to the golf ball physical situation; and providing coaching to the player relating to the golf ball physical situation shown in the selected picture. Preferably, the providing the coaching comprises storing action information in a memory and electronically and automatically selecting a plurality of specific discrete physical actions from the stored action information and displaying them on the display based on the received input. Preferably, the providing the coaching comprises: providing a professional computer remote from the client computer, the professional computer having a second display; displaying the selected picture and the additional inputs on the second display; review of the selected picture and additional inputs by an expert in the sport; and communicating the coaching to the player by the expert. Preferably, the client computer includes a range finder system and the receiving additional inputs comprises using the range finder system to generate an overhead view of a golf course hole showing distances from the golf ball to predetermined terrain features of the golf course hole; the displaying on the second display comprises displaying the overhead view of the golf course hole with distances on the second display; and the providing coaching comprises providing the coaching based on the overhead view as well as the golf ball physical situation shown in the picture. Preferably, displaying a plurality of pictures and the receiving an input are repeated a plurality of times and each time a different set of pictures is displayed. Preferably, the plurality of pictures are selected from picture sets illustrating the lie of a golf ball, the slope of the course in the direction of the intended line of flight at the position of a golf ball, or the ball position uphill or downhill of the player along a line substantially perpendicular to the plane of the player's body. Preferably, the displaying a plurality of pictures comprises displaying pictures selected from the group consisting of: pictures showing the lie of a golf ball, each of the pictures showing a different lie that may occur on a golf course; pictures showing the slope of the course in the direction of the intended line of flight at the position of a golf ball, each of the pictures showing a different such slope that may occur on a golf course; and pictures showing the ball position uphill or downhill of the player along a direction substantially perpendicular to the plane of the player's body from left to right, each of the pictures showing a different such ball position that may occur on a golf course.

The invention also provides a method for coaching a player in judgmental aspects of golf or for practicing the judgmental aspects of golf, the method comprising: providing a client computer having a display and a camera; providing a second computer at a location remote from the client computer, the second computer having a display; using the camera, taking a picture of a physical situation of a golf ball for which the player wants coaching; transmitting the picture to the second computer; displaying the picture on the display of the second computer; and providing real-time coaching to the player based on the picture. Preferably, the method preferably comprises determining the position coordinates of the golf ball and the transmitting comprises transmitting the position coordinates. Preferably, the position coordinates include the altitude of golf ball in the picture. Preferably the picture is selected from the group consisting of an overhead view of the golf ball, a left side view of the golf ball, a right side view of the golf ball, a front view of the golf ball, a back view of the golf ball and a distance view toward the green from the golf ball. Preferably, the providing a professional computer comprises providing a plurality of the professional computers and the method further comprises: providing a call center computer including call center software; and using the call center computer to select the one of the professional computers to which to transmit the picture. Preferably, the providing a client computer comprises providing a cell phone and wherein the method further comprises: providing a telephone at the location of the professional computer; and the user and a professional golfer at the location of the professional computer talking about the golf ball physical situation shown in the picture.

The invention further provides a method for coaching a player in judgmental aspects of golf or for practicing the judgmental aspects of golf, the method comprising: providing a recording system; recording a golf ball physical situation that occurs while a player is playing golf; transmitting the recorded golf ball physical situation to a professional computer remote from the recording system; displaying the recorded and transmitted golf ball physical situation on the professional computer; and providing coaching to the player, by an expert at the location of the professional computer, based on a review of the recorded golf ball physical situation. Preferably, the recording further comprises recording: one or more actions taken by the player in response to the golf ball physical situation; and the result of the actions; the transmitting further comprises transmitting the recorded one or more actions and the recorded result; and the providing coaching comprises providing coaching to the player, by an expert at the location of the professional computer, based on a review of the recorded golf ball physical situation, the recorded one or more actions, and the recorded result. Preferably, the providing a recording system comprises a providing a golf range finder system with a memory, and the method further comprises: using the range finder system, generating an overhead view of a golf course hole showing distances from the golf ball to predetermined terrain features of the golf course hole; the transmitting comprises transmitting the overhead view to the professional computer; and the displaying comprises displaying the overhead view on the display of the professional computer. Preferably, the recording of the physical situation includes recording the altitude of the golf ball.

In another aspect, the invention provides a method for coaching a player in judgmental aspects of golf or for practicing the judgmental aspects of golf, the method comprising: providing an electronic memory; storing in the memory: pictures of a golf ball physical situation that may occur in golf; and response pictures or response descriptions illustrating a plurality of actions that may be taken in response to the physical situation, the response picture or response descriptions including a response that an expert would take to the golf ball physical situation; receiving a request for the coaching or practice; in response to the request, displaying the pictures of the golf ball physical situation; receiving an input requesting what an expert would respond to the physical situation; and displaying the pictures or descriptions illustrating the response of the expert. Preferably, the method further comprises displaying a plurality of the response pictures or response descriptions of possible actions responsive to the physical situation; receiving an input indicating the selection of one or more of the response pictures or response descriptions and recording the selection; and recording the selection. Preferably, the method further comprises comparing the selected response pictures or response descriptions with the response of the expert to determine a score and displaying the score. Preferably, the method further comprises storing a record of the physical situation and the score in a player database.

In still another aspect, the invention provides a method for coaching a player in judgmental aspects of golf, the method comprising: providing a client computer having a client computer display and a golf professional computer having a professional computer display; using the client computer and the client computer display, selecting a plurality of pictures illustrating a golf ball physical situation of immediate interest to the player; transmitting the plurality of pictures to the professional computer and displaying the plurality of pictures on the professional computer display; and providing coaching to the player on the judgmental aspects of golf at least partially based on the plurality of pictures. Preferably, the selecting a plurality of pictures comprises displaying a plurality of pictures on the client computer display, each of the pictures comprising a picture illustrating a golf ball physical situation, each of the pictures illustrating a different gold ball physical situation, and receiving an input that one of the plurality of pictures has been selected. Preferably, the client computer has a camera associated with it and the selecting comprises taking a picture of a golf ball in a physical situation with the camera. Preferably, the client computer includes a range finder system associated with it and the selecting a plurality of pictures comprises, using the range finder system, generating an overhead view of a golf course hole showing distances from the golf ball to predetermined terrain features of the golf course hole, and wherein the transmitting and displaying comprises transmitting and displaying the overhead view of the golf course hole. Preferably, the providing a golf professional computer comprises providing a plurality of the golf professional computers, each having a display; the method further comprises providing a golf call center server computer; and the transmitting comprises, using the golf call center computer, choosing one of the golf professional computers to which to transmit the pictures.

In still another aspect, the invention provides a system for coaching a player in judgmental aspects of golf or for practicing the judgmental aspects of golf, the system comprising: a computer readable medium embodying instructions for directing a first processing unit to: display one or more pictures of a golf ball physical situation that may occur in golf; receive an input requesting what an expert would respond to the physical situation; and in response to the input, displaying a response picture or response description illustrating the response that an expert would take to the golf ball physical situation. Preferably, the instructions further include instructions for directing the first processing unit to: receive a request to display a plurality of response pictures or response descriptions of possible actions responsive to the physical situation; in response to the request, display response pictures or response descriptions illustrating a plurality of actions or play items that may be taken in response to the physical situation; receive a signal indicating a selection of one or more of the response pictures or response descriptions; and display the selected one or more response pictures or response descriptions. Preferably, the instructions for directing further comprise instructions for directing the first processing unit to: compare the selected response pictures or response descriptions to the response of the expert to determine a score; and display the score. Preferably, the instructions to display one or more pictures of a golf ball physical situation comprise instructions for directing the first processing unit to display an overhead view of a golf course hole showing distances from the golf ball to predetermined terrain features of the golf course hole.

In yet another aspect, the invention provides a golf call center system comprising: a plurality of portable client computer systems, each having a display, a memory, a camera, a portable telephone, and a golf call center client computer software application stored in the memory; a plurality of golf professional computers system, each having a golf professional computer memory, a golf professional computer display, a telephone, and a golf call center professional computer application stored in the golf professional computer memory; a call center server computer system; and a call center manager software application on the call center server computer system. Preferably, the call center system further includes stored prerecorded responses to a golf ball physical situation that may occur in playing golf. Preferably, the system further comprises a range finder system for generating an overhead view of a golf course hole showing distances from the golf ball to predetermined terrain features of the golf course hole. Preferably, the system further comprises a player database storing information relating to the golf skills of a plurality of golf players. Preferably, the system further comprises a golf course database storing golf course mapping information.

In still another aspect, the invention provides a method for coaching a player in judgmental aspects of golf, the method comprising: providing: a client computer having a position locater system and a client computer display; and golf call center system remote from the client computer, the golf call center system having a golf professional computer having a professional computer display; storing golf course mapping data on the call center system; determining the location coordinates for a golf ball position; transmitting the location coordinates to the golf call center system; using the location coordinates and the stored golf course mapping data, generating with the call center system an overhead view of a golf course hole showing the position of the ball and terrain features of the hole; displaying the overhead view of a golf course hole on the professional computer display; and coaching the player based on the generated overhead view. Preferably, the storing further includes storing pictures of the golf course on the golf call center system, the method further comprises displaying one or more of the pictures on the professional computer display, and the coaching comprises coaching the player based on the generated overhead view and the one or more pictures. Preferably, the storing further comprises storing player information for a plurality of players on the golf call center system, the player information including the golf handicap of each of the plurality of players; the transmitting further comprises transmitting an identification of the player to the golf call center system; the method further comprises, responsive to the identification of the player, retrieving the stored player information for the player having the identification; and the displaying further comprises displaying the stored and retrieved player information on the professional computer display.

The invention also provides a method for coaching a player in judgmental aspects of golf, the method comprising: providing: a client computer having a position locator system; and a golf call center system having stored pictures of a plurality of golf courses, and having a golf professional computer having a professional computer display; using the position locator system, determining the location coordinates for a golf ball position on a golf course; transmitting the location coordinates to the golf call center system; using the position location coordinates, displaying on the professional computer display one or more pictures of the golf course at or near the golf ball position; and coaching the player based on the one or more pictures.

In another aspect, the invention provides a method for coaching a player in judgmental aspects of a sport or for practicing the judgmental aspects of the sport, the method comprising: providing a client computer having a first display; displaying a plurality of pictures on the first display, each of the pictures showing a different physical situation that may occur in the sport; receiving an input indicating that the player has selected one of the pictures to describe a physical situation with respect to which the player wants coaching; receiving additional inputs describing the physical situation, including distance information, sufficient to provide coaching related to the physical situation; and providing coaching to the player relating to the physical situation shown in the selected picture.

In yet another aspect, the system provides a method for coaching a player in judgmental aspects of a sport or for practicing the judgmental aspects of the sport, the method comprising: providing a client computer having a display and a camera; providing a professional computer at a location remote from the client computer, the professional computer having a display; using the camera, taking a picture of a physical situation in the sport for which the player wants coaching; transmitting the picture to the professional computer; displaying the picture on the display of the professional computer; and providing coaching to the player based on the picture.

In a further aspect, the invention provides a method for coaching a player in judgmental aspects of a sport or for practicing the judgmental aspects of the sport, the method comprising: providing an electronic memory; storing in the memory: pictures of a physical situation that may occur the sport; and response pictures or response descriptions illustrating a plurality of actions that may be taken in response to the physical situation, the response picture or response descriptions including a response that an expert in the sport would take to the physical situation; receiving a request for the coaching or practice; in response to the request, displaying the pictures of the physical situation; receiving an input requesting what an expert would respond to the physical situation; and displaying the pictures or descriptions illustrating the response of the expert. Preferably, the method further comprises: displaying a plurality of the response pictures or response descriptions of possible actions responsive to the physical situation; and receiving and input indicating the selection of one or more of the response pictures or response descriptions.

The system also provides a method for coaching a player in judgmental aspects of a sport, the method comprising: providing a client computer having a client computer display and professional computer having a professional computer display; using the client computer and the client computer display, selecting a plurality of pictures illustrating a physical situation of immediate interest to the player; transmitting the plurality of pictures to the professional computer and displaying the plurality of pictures on the professional computer display; and providing coaching to the player on the judgmental aspects of the sport at least partially based on the plurality of pictures.

In still a further aspect, the invention provides a system for coaching a player in judgmental aspects of a sport or for practicing the judgmental aspects of the sport, the system comprising: a computer readable medium embodying instructions for directing a first processing unit to: display one or more pictures of a physical situation that may occur in the sport; receive an input requesting what an expert would respond to the physical situation; and in response to the input, display a response picture or response description illustrating the response that an expert would take to the physical situation. Preferably, wherein the instructions further include instructions for directing the first processing unit to: receive a request to display a plurality of response pictures or response descriptions of possible actions responsive to the physical situation; in response to the request, display response pictures or response descriptions illustrating a plurality of actions that may be taken in response to the physical situation; receive a signal indicating a selection of one or more of the response pictures or response descriptions; and display the selected one or more response pictures or response descriptions.

In yet a further aspect, the invention provides a sport call center system comprising: a plurality of portable client computer systems, each having a display, a memory, a camera, a cell phone, and a sport call center client computer software application stored in the memory; a plurality of professional computers system, each having a professional computer memory, a professional computer display, a telephone, and a call center professional computer application stored in the professional computer memory; a call center server computer system; and a call center manager software application on the call center server computer system. Preferably, the system further includes golf course terrain maps for a plurality of golf courses stored in the call center server computer system or one of the professional computer systems. Preferably, the system further includes pictures of a plurality of golf courses stored in the call center server computer system or one of the professional computer systems.

In a further aspect, the invention provides a system for coaching a player in judgmental aspects of an athletic sport or for practicing the judgmental aspects of the sport, the system comprising: a portable electronic device including a first computer having a display and a memory, a camera; a telephone and a position locator system; and a plurality of pictures stored in the memory, each of the pictures showing a different physical situation that may occur in the sport.

The invention for the first time provides a sport coaching system that is simple to use, accurate as well as being fast enough to be used within the time constraints of sports, such as golf. Numerous other features, objects, and advantages of the invention will become apparent from the following detailed description when read in conjunction with the accompanying drawings.

BRIEF DESCRIPTION OF THE DRAWINGS

FIG. 2 illustrates the display of physical factors that may be automatically entered via a coordinate locater and information system;

FIG. 3 illustrates the display of some factors that may be entered via a conventional pull down menu, and icons that may be used to enter physical factors that are described by pictures;

FIG. 4 illustrates a first layer of pictures that may be displayed to communicate the lie of the ball to the system;

FIG. 19 is a flow chart illustrating a system set-up process according to a preferred embodiment of the invention;

FIG. 20 is a flow chart illustrating a preferred embodiment of a process according to the invention that may be used for consulting with a golf professional about a round of golf that has been recorded and stored by the system;

DETAILED DESCRIPTION OF THE PREFERRED EMBODIMENT

Figure 1:
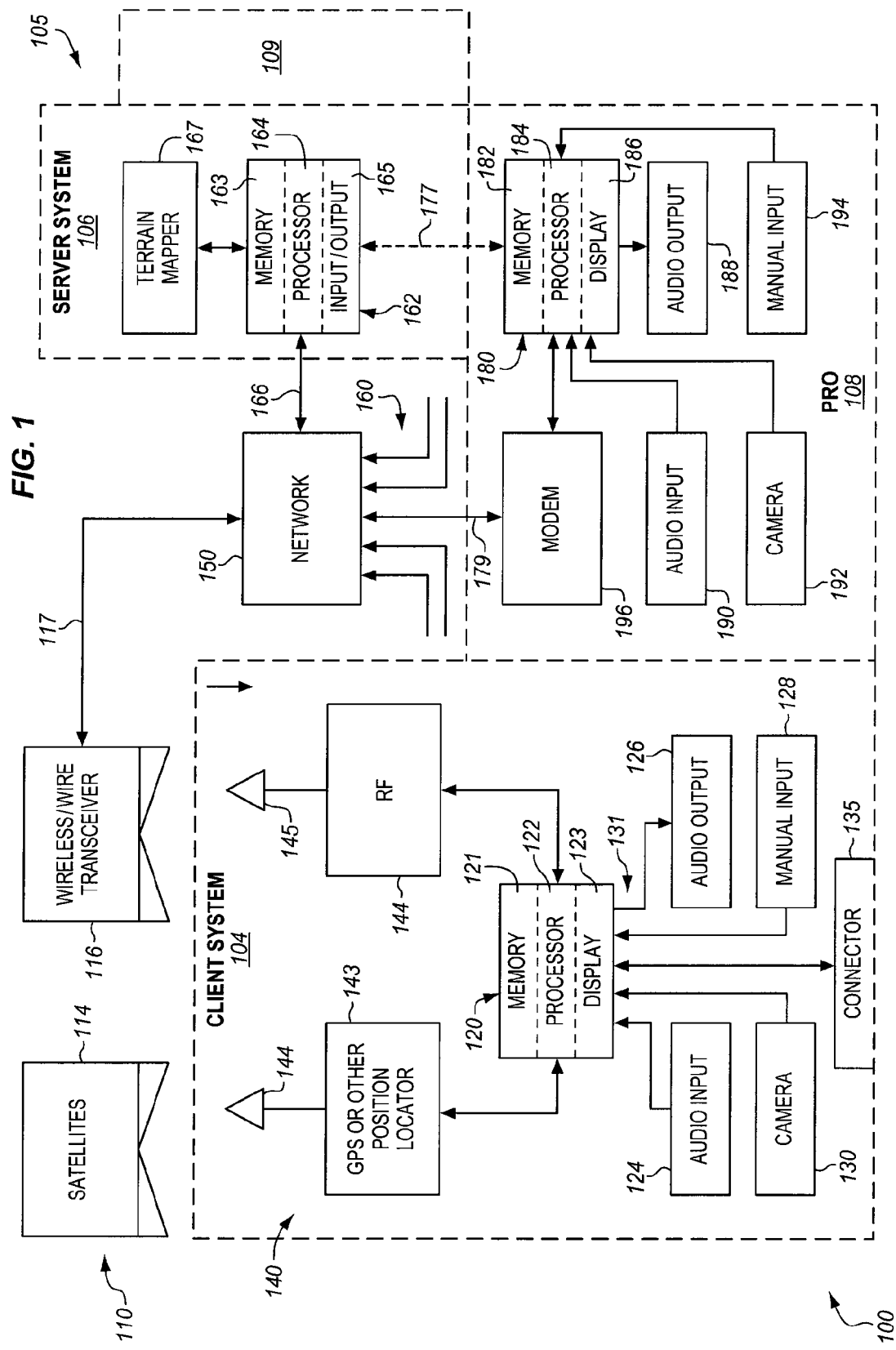
FIG. 1 is a block diagram of a generalized electronic personal coaching system according to the invention.

The invention provides a system and methods for providing personal coaching to persons playing sports, in real-time while they are engaged in the sport, and/or for practicing the judgmental aspects of golf at other times. As indicated above, one object of the invention is to level the playing field between the average player of a sport, such as golf, and the richer players and professionals. The disclosure is written in terms of the sport of golf, but it can also be applied to other sports. Another object of the inventor has been to create a system to provide coaching and meaningful practice in the aspects of a sport that require judgment and strategy, in contrast to the physical aspects of a sport. For example, the majority of the time spent in the game of golf is devoted to judgment—choosing the right club, deciding on the shot, stance, ball position, body position, deciding how hard to swing, and so forth—yet, prior to the invention, the only time a golfer was able to practice this aspect is the relatively short time the golfer spends playing with a professional, which also was quite expensive. Another object of the inventor has been to provide an easy to use sport professional coaching system. In its simplest and most transparent aspect, the invention accomplishes this goal. For example, a golfer playing a round of golf on a golf course, may find herself or himself facing a shot on which the golfer wishes he or she could consult with a professional. The golfer pulls out a cell phone, presses a button, a golf professional answers the phone, and somehow the professional knows exactly the shot the golfer is facing, and gives appropriate coaching. If the golfer's phone has a camera, the pro might ask the golfer to take a picture of the ball. The golfer does this, and without the golfer doing anything else, the pro knows exactly the lie of the ball and can appropriately adjust the coaching. Or, in an alternative scenario, when the golfer needs professional guidance, the golfer pulls out his cell phone with built-in camera, takes a picture of the ball, and in about twenty seconds a professional is on the line providing great coaching without the golfer doing anything more. In this manner, the average player can consult with knowledgeable person, as easily as a professional golfer, or people with more money than others, can consult with a caddy.

The manner in which the invention makes the above scenarios possible is summarized in FIGS. 24 and 25 below and the discussion associated with these two figures. However, the invention provides much more than this. Various other embodiments of the invention that will assist the reader in understanding how the scenarios above are made possible by the invention and which include features that may be used in creating the scenarios, are discussed in connection with FIGS. 1 through 23. A golf instruction and practice website and/or game program according to the invention that utilizes some features of the invention is disclosed in FIGS. 26-29.

Since the invention relates to a subject matter that is not in common use, i.e., providing coaching regarding the judgmental aspects of a sport with an electronic system, there are no commonly used terms available for many of the concepts. Thus, in some cases, we have had to create such terms. The terms generally should be interpreted in a common sense manner. For example, when a physical situation is referred to, it means a situation that can be described in physical terms that ordinarily occurs in the particular support and involves only conditions that actually influence play in the sport. Thus, in respect to golf, it includes things like the distance from the ball to the green or pin, the grade between the ball and the green, the green speed, the obstacles between the ball and the green, the conditions of the ground, the lie of the ball, the slope along the intended line of flight of the ball, the ball position uphill or downhill relative to the golfer, and the wind speed. It does not mean the position of the stars, or whether there is a golf cart moving along the periphery of the course. That is, the terms used in this disclosure should be interpreted narrowly within the meanings usually used in sports or, if a particular sport is referred to, within the meanings usually used in the particular sport in question. With respect to the sport of golf, the term "grade to green" means the amount that the elevation of the green differs from the elevation of the ball, "obstacle" means an object between the ball and the green that could deflect or stop the flight of the ball, ground conditions mean whether the ground on which the ball lies is soft, hard, wet, or dry, lie means the type of terrain on which the ball lies or in the immediate surroundings of the ball, e.g., fairway, rough, sand, mud, water, gravel, etc., slope means the slant of the terrain in the immediate surroundings of the ball in the direction along the intended line of flight of the ball, and ball position, in the context of physical situation, means the whether the ball is uphill or downhill from the player along the direction perpendicular to the left-to-right plane of the body of the golfer. The term "action" or "play item", means something that the player can physically adjust either in his body or club to change how the ball will fly when hit, such as the club used, the shot type, the angle of the club face, the grip on the club, the player's body position, the player's stance, the ball position, the player's weight distribution, and the player's swing. In the context of "action" or play item", the term "club" means wood, iron, wedge or putter and the number of the club etc., "shot type" means, pitch, chip, putt, etc., "club face" means the angle that the face of the club deviates from the perpendicular to the line of intended flight of the ball, grip means how the club handle is held in the player's hands, "body position" means whether the body of the player from the player's left to right is aligned with a plane along the direction of the line of flight or at an angle to the plane, "stance" means whether the feet of the player from the player's left to right are aligned with a plane along the direction of the line of flight or at an angle to the plane, and generally the stances available are normal, open or closed, "ball position" means the position of the ball with respect to the player's feet, i.e., the position along a line substantially parallel to the plane of the player's body but through the club head, "weight" means the relative proportion of the player's weight that is on the right or left foot, and "swing" means whether the movement of the club is the normal movement of the club in raising it and striking the ball or is modified from the normal movement. In this disclosure "professional" means a person who is sufficiently expert in some aspect of a sport to either earn money in some way from the sport or be generally accepted as someone who is qualified to provide coaching or advice in the sport. In this disclosure, real-time has its usual meaning. For example, "real-time" coaching in golf means that the coaching is provided at the time the player is playing a golf game, as though the coach is standing next to the person needing the coaching while he or she is playing.

FIG. 1 is a block diagram of a generalized personal coaching system 100 according to the invention. System 100 comprises a user communication and processing system 104, which may be referred to as a client system 104, a server system 106, which, in one embodiment, may act as an automatic electronic coach 106, and a professional system 108 used by an expert, such as a golf professional. A wireless communication system 110 comprising satellites 114, a wireless to wired transceiver 116, or both connect the client system 104 to the coach systems 106 and 108, preferably via connector 117 and network 150. As will be seen in detail below, client system 104 may be a smart cell phone, a dedicated handheld golf range finder, a general purpose hand-held computer, a personal computer (PC), or other such system, and is preferably portable. This system 104 is used by a player of a sport, such as a golfer, to enter and communicate physical factors relating to his or her play, and to receive personal coaching. The physical factors may be processed by local computer 120, electronic coach server 106, by an expert, such as a golf professional using professional system 108, or a combination of the above. The personal coaching may originate from a program stored in local computer 120, a program in electronic coach server 106, or from the expert using professional system 108, or a combination of the above.

Client system 104 preferably includes a computer 120 which preferably comprises a processor 122, a memory 121 and a display 123. Client system 100 also includes audio input 124, audio output 126, manual input 128, such as a keyboard or a touch screen, camera 130, which may be a still camera, a video camera or a combination of the two, and a connector 135 for connecting external electronics, which connector is preferably a USB connector but may be any other electronic connector. All of the foregoing communicate with computer 120, preferably via a bus 131. Client system 104, may include a locator and course information system 140, which, in some embodiments may be a system such as described in U.S. Pat. No. 5,685,786 issue to Dudley on Nov. 11, 1997, U.S. Pat. No. 5,507,485 issued to Fisher on Apr. 16, 1996, U.S. Pat. No. 5,438,518 issued to Bianco et al. on Aug. 1, 1995, and U.S. Pat. No. 5,364,093 issued to Huston et al. on Nov. 15, 1994, or any other similar locator system, with the improvements as discussed herein. Locator and course information system 140 includes a GPS or other position locator 143, also having an electrically connected aerial 141. In some embodiments, locator and course information system 140 may include software and data in memory 121 that enables the user to locate and determine distances to terrain features of the course. However, in other embodiments, the software and data that locate the terrain features and provide the distances may be located in server system 106 or professional system 108, or both. Client system 104 also includes a radio frequency (RF) transceiver 144 having an aerial 145 electrically connected to it. Network 150 is preferably an internet, a LAN, a telephone network, a cable network, a combination of such networks, or any other network.

Server system 106 preferably comprises a computer 162 which preferably includes a processor 164, memory 163 and input/output devices 165, which preferably includes a display, a keyboard, headphones, and other conventional input and output devices used with servers. Terrain mapper 167 is preferably part of computer 162 and includes appropriate database software stored in memory 163, but is broken out separately as it is an important aspect of the invention. Computer 162 preferably communicates with the systems 104 and 108 via and appropriate connection system 166 and network 150. There may be a plurality of servers systems connected to network 150, and another server system is indicated at 109.

Professional system 108 includes a computer 180 comprising a processor 184, a memory 182 and a display 186. System 108 also includes audio input 190, audio output 188, manual input 194 and camera 192, which may be a still camera, a video camera or a combination of the two. Professional system 108 also preferably includes a modem 196, which connects to network 150. Alternatively, it may connect to server system 106 via a direct electronic connection 177, which may be a bus, or any other connection. System 108 is representative of a plurality of other professional systems of identical or similar design that communicate with server 106 via electronic connections 160. Alternatively, professional system 108 may communicate directly with client system 104, via wireless system 110. Together, Professional systems 108 and servers 106, 109 provide a sport call center 105.

FIG. 2 illustrates a client system 104 having a display 123 showing an exemplary screen 201 displaying physical factors 202 that may be entered manually or automatically entered via a position locator system, which preferably is a GPS assisted locater. This manner of manually or automatically entering these physical factors using client computer 104 is disclosed in the '290 and '572 patent mentioned above, and is included herein to illustrate the fact that these physical factors can be entered in this manner in combination with the other methods and systems of the invention disclosed herein. In the embodiments of FIGS. 2-17, the client system 104 is "smart" cell phone, such as the iPhone, though it may be any other computer system. The information entered in FIG. 2 includes the name 204 of the golf course, the hole and par for the hole 207, the pin distance 209 which is shown as 70 yards at 210, the distance 212 to the front of the green, which is shown as 42 yards at 214, the distance 216 to the back of the green, which is shown as 90 yards at 217, and the condition 219 of the green, which is shown as fast at 220. As known in the art, these distances may be obtained by the combination of coordinate or other locator information and a stored map of the course with the key indicators stored at known locations. The speed of the green may be entered by a person at the golf course daily or as the condition changes, and stored in server 106 for retrieval via wireless.

FIG. 3 illustrates a client computer 104 having a display 123 with an exemplary screen 230 showing of some factors that may be entered by the user from pull down menus. The grade 232 may be entered by clicking on box 233 which opens a pull down menu with a variety of options related to the grade. These options may be downhill, steep downhill, uphill, steep up hill and other such variations. One of these options may be selected by the user. Similarly, the wind factor 234 may be entered into the system 100 by clicking on box 236 to activate a pull down menu to select the wind direction, and on box 239 to select a wind strength. Alternatively the wind strength may be selected by indicating a wind speed, if known. The height of an obstacle may be entered from a pull down menu by clicking on box 242, while the distance from the ball of the obstacle may be entered from a pull down menu by clicking on box 244. These menu-entered items are illustrated as examples showing that many different processes may be used to enter data into the system 100.

Buttons 250 utilize the picture method according to the invention to enter the data. In this disclosure the term "picture" means a photograph of a ball showing the lie of the ball, a drawing that depicts the lie of the ball on a golf course, or a photograph or drawing that shows other information concerning the golf ball physical situation or actions responding to the physical situation and which assist in providing coaching or practice of the judgmental aspects of a sport in accordance with the invention. The picture method of entering data is useful as it tends to be more accurate than drop down menus, and it also addresses data that does not lend itself to entry via location finding systems. Button 252 accesses a series of pictures from which the lie can be selected. Button 254 provides access to a series of pictures from which the slope may be selected. Button 256 accesses a series of pictures from which the ball position relative to the golfer may be selected. FIG. 4 illustrates a screen 258 displaying a first layer 260 of pictures that may be presented on display 123 to communicate the lie of the ball to the system 100. Written directions 262 at the bottom of the display direct the user to click on the picture that looks most like the lie of the user's ball. These directions may also be presented via a sound message. Pictures 260 include a picture 264 showing a golf ball lying on a closely cropped fairway, a picture 266 showing a golf ball in the rough, picture 268 showing a golf ball in a sand trap, picture 270 showing a golf ball partially embedded in a soft surface, picture 272 showing a golf ball in water, and picture 274 showing a golf ball on a rocky or gravely surface. Other buttons 280, 284, 286 and 288 on screen 258 provide additional functions associated with screen 258. Button 280 links to the previous screen, button 284 links to a screen that provides additional pictures that show ball lies that occur less frequently. Button 286 communicates that none of the pictures sufficiently show the ball lie and brings up a screen that may be used to exchange information with system 100, such as pictures, written messages, or audio messages. Button 288 links to a screen that provides help regarding the functions and uses of the current screen and/or the system 100, respectively. Heading 281 indicates to the user that possible lies of the ball are being displayed.

Figure 5:
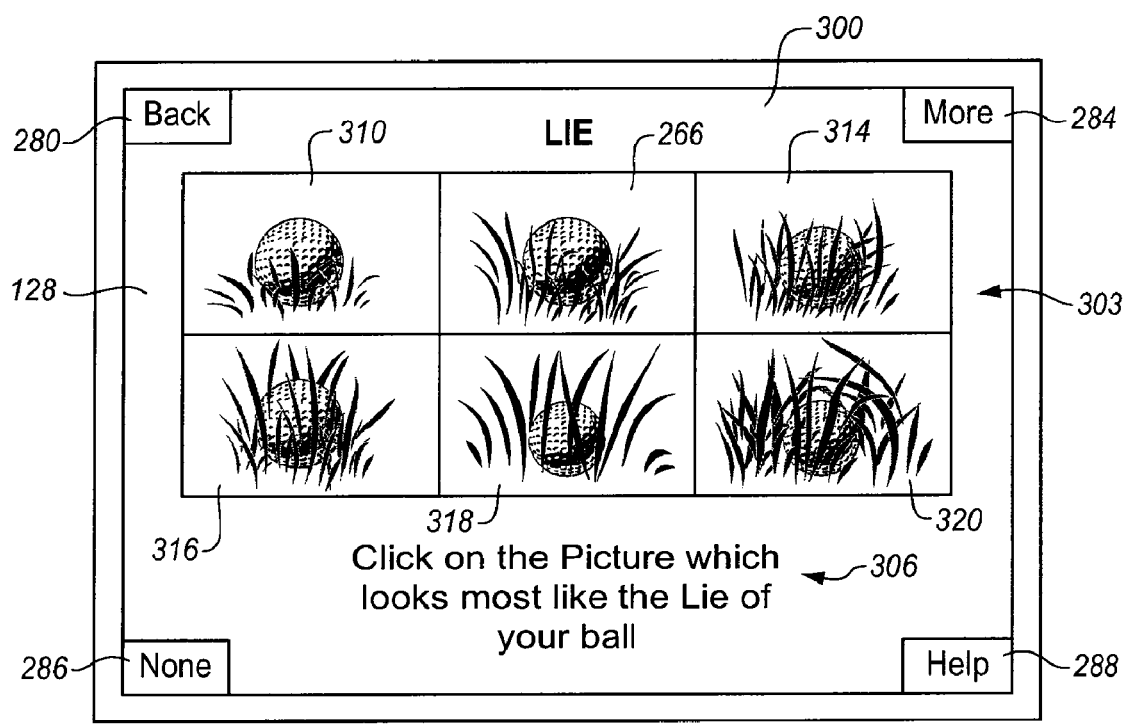
FIG. 5 illustrates a second layer of pictures that may be displayed to assist the user in communicating one aspect of the lie of the ball.

FIG. 5 illustrates a screen 300 showing a second layer 303 of pictures or drawings that as may be presented on display 123 to assist the user in communicating one aspect of the lie of the ball. This set of pictures 303 illustrates pictures that may be displayed if picture 266 in FIG. 4 is clicked on. Pictures 303 show various lengths of grass in the rough.

Preferably, the second layer of pictures, such as 303, will contain one picture that is identical to the picture clicked on in the first layer, such as 260. In this case, it is picture 266. This picture that is repeated in the second layer is preferably located in the same position as the figure in the first layer. This has several advantages. First, if the picture happens to be the picture that best illustrates the lie of the user's ball, then all the user has to do is click twice in the same place to indicate that this is the picture to communicate to the system 100. Secondly, it is physiologically and psychologically less confusing to the user because it appears that the system just replaced the pictures that were not relevant with pictures that were more relevant. However, some users may prefer that the picture that was clicked on appear in the first position, i.e., the picture to the top left, in the second layer, and the system allows the user to custom select either of these modes. Returning to the pictures 303, in picture 310, the grass is relatively short, the grass is a little longer in picture 266 so that it essentially covers the ball. In picture 314, the grass is about the same length as in picture 266, but is denser. In picture 316, the ball is relatively deep in a rough in which the grass is tall but relatively sparse, and even deeper in a sparse-tall grass rough in picture 318. In picture 320, the grass is both tall and dense. While it takes time to describe in words the differences in the pictures, and patent drawing practice discourages the use of actual pictures, the point to be made here is that by showing the user a variety of pictures, the system allows the user to quickly communicate to the system the lie of the ball. Again, the directions 306 under the pictures direct the user to click on the picture that is most like the lie of the user's ball.

Figure 6:
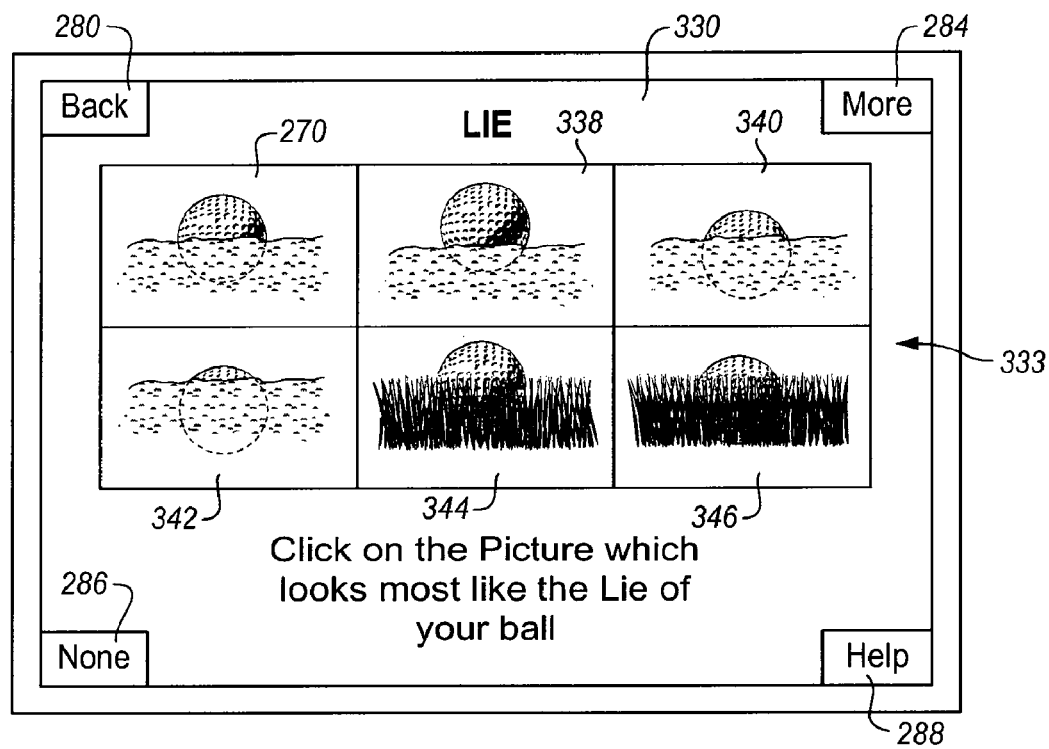
FIG. 6 illustrates another second layer of pictures that may be displayed to assist the user in communicating a second aspect of the lie of the ball.

FIG. 6 illustrates a screen 330 showing another second layer 333 of pictures that may be displayed in response to the user clicking on picture 270 in FIG. 4, or which may be displayed as a first level layer in some conditions. Pictures 336, 338, 340 and 342 show a ball in varying degrees of being embedded in relatively grass free soil, and picture 344 and 346 show a ball embedded to varying degrees in sod. As will be explained in more detail in connection with FIG. 21, the system 100 learns the terrain of golf courses. As an example, the pictures of FIG. 6 may represent a selection of pictures selected previously by users at the same or approximately the same location on this specific course, Happy Meadows. Since the system knows the course, it simplifies and accelerates the choice of the user by presenting ball lies that have occurred previously at that location. Again, while the invention preferably presents actual photographs of the lie of a golf ball, in many cases a drawing may more clearly assist the user in designating the lie of the ball. The patent application drawing is not intended to accurately depict a picture of an actual lie of the ball on a course, but rather is intended, under the limitations of drawings for patent applications, to illustrate a variety of pictures 333 that may be presented to the user allowing the user to quickly instruct the system 100 on the lie of the ball. In pictures 333, the picture that is the same as the picture clicked on in FIG. 4, is displayed as the first picture in the series of pictures 333. Some users will prefer this format, because they find it natural to start examining a series of pictures at the top left corner as one does when turning to a new page while reading a book.

Figure 7:
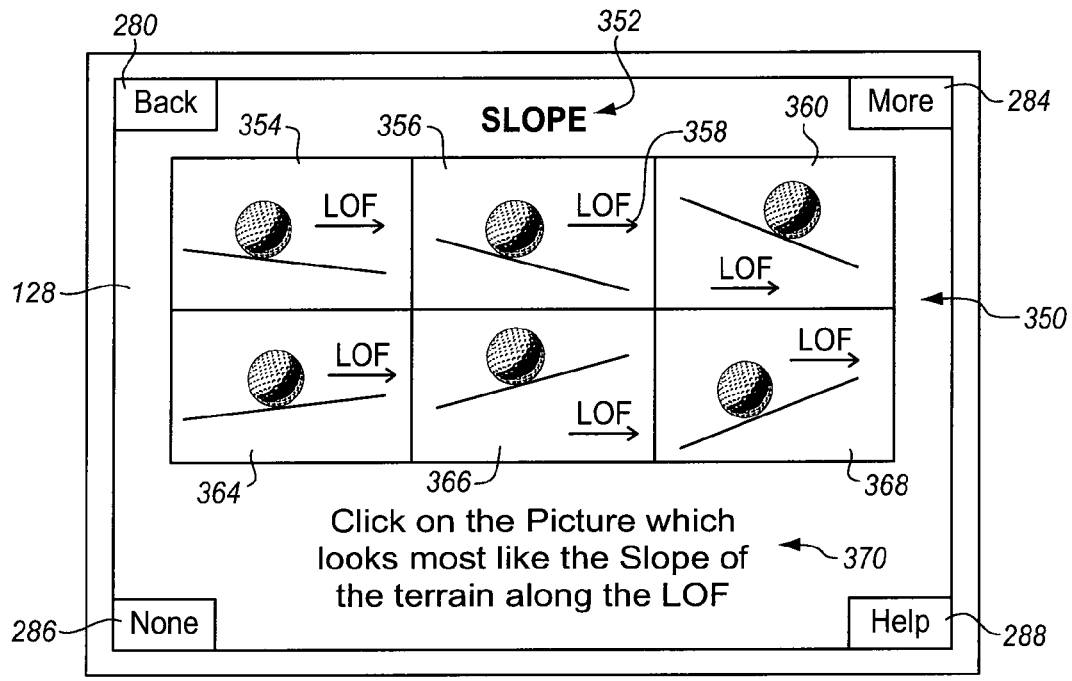
FIG. 7 illustrates pictures that may be displayed to assist the user in communicating the ball position relative to the golfer.

FIG. 7 illustrates pictures 350 that may be displayed in response to a user clicking on the "Slope" button 254 of FIG. 3, which is indicated by the screen heading 352. "Slope" is the term that the invention uses to designate the slope of the terrain in the direction toward the green, though any other understandable designation may be used. In each picture, the line of flight (LOF) of the ball, which is the direction to the green, is indicated by an arrow, such as 358. Other designations, such as DTG (direction to green) may be used also. Pictures 354, 358 and 360 illustrate the ball lying on terrain with varying degrees of downhill slope toward the green, and pictures 364, 366 and 368 illustrate the ball lying on terrain with varying degrees of uphill slope toward the green, i.e., along the line of intended flight of the ball. Directions 370 tell the user to click on the picture that looks most like the slope of the terrain along the line of flight, though other wording may be used. As in the above examples, clicking on one of the pictures may link to another layer. However, in communicating slope, it usually is not necessary to achieve a finer level of distinction in than can be presented on one screen. The system 100 allows the user to select the desirable level of distinction, i.e., the number of layers of pictures to be presented.

Figure 8:
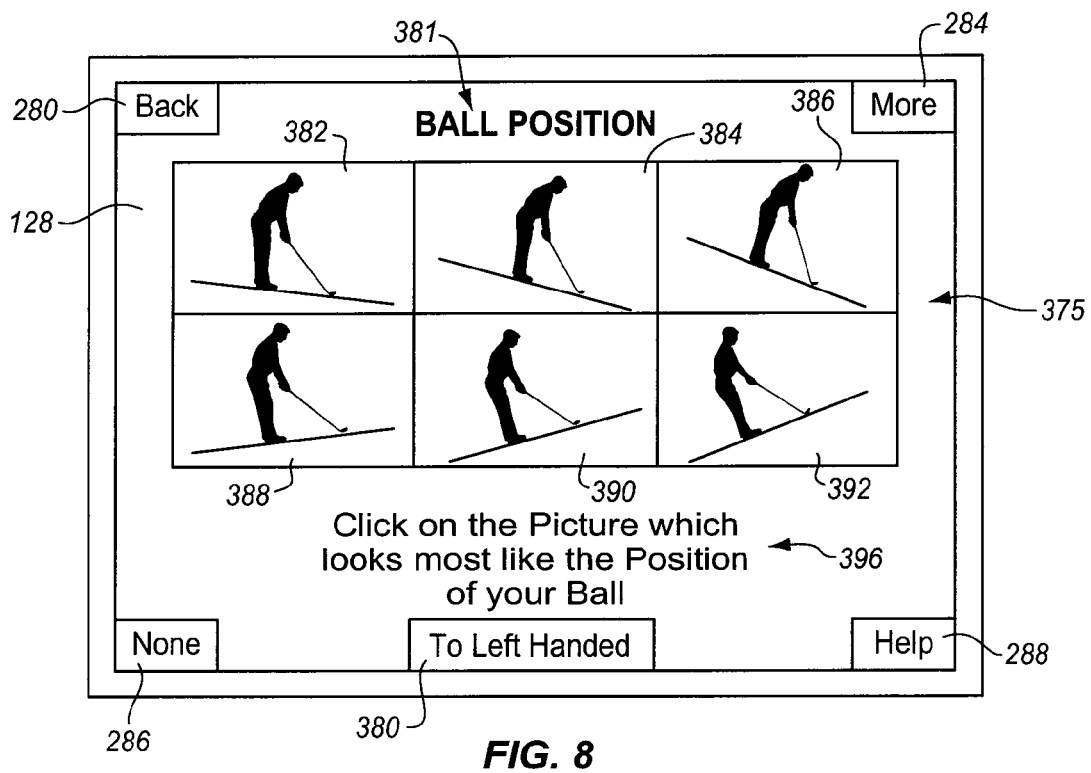
FIG. 8 illustrates pictures that may be displayed to assist the user in communicating the slope of ground in the immediate neighborhood of the ball.

FIG. 8 illustrates pictures 375 that may be displayed in response to a user clicking on the "Ball Position" button of FIG. 3, which is indicated by the heading 381. "Ball Position" with respect to the ball physical situation is the term the invention uses to designate the position of the ball uphill or down hill from the position of the golfer along a line perpendicular to the plane of the golfer's body, the plane being the plane from left to right of the golfer's body. This "ball position" is sometimes referred to in golf instruction manuals as the position in relation to the stance of the golfer. Other terms may also be use to indicate this relationship. The pictures 375 are shown for a right-handed golfer. By clicking on button 380, pictures appropriate for a left-handed golfer may be shown. When the left-handed pictures are shown, the button 380 changes to "To Right Handed" and takes you back to the right-handed pictures. Whether left-handed or right-handed is the default, may be selected n the personal data or preferences screen, as discussed in connection with FIG. 19. Pictures 382, 384 and 386 illustrate the ball lying on terrain in which the ball is below the level of the stance of the golfer, and pictures 388, 390 and 392 illustrate the ball lying in terrain in which the ball is above the level of the stance of the golfer. Directions 396 tell the user how to communicate the ball position to the system. As in the above examples, clicking on one of the pictures may link to another layer. However, in communicating ball position, it usually is not necessary to achieve a finer level of distinction in than can be presented on one screen, and, as mentioned above, the level of distinction, i.e., the number of layers or pictures to be presented, can be selected by the user in setting up the system 100.

Figure 9:
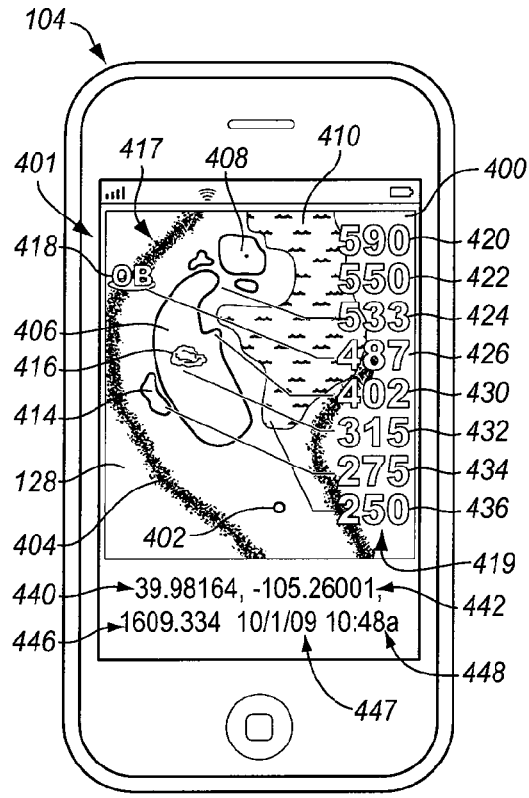
FIG. 9 illustrates how various distances found from a course map and a coordinate locator system may be displayed.

FIG. 9 illustrates a client system 104 with a display 123 showing a rangefinder screen 400 that displays various distances on the golf course. As known in the art, these distances are found using a course map and a locator system 140. The course map is preferably downloaded from server 162 and stored in memory 121, though it may be located in either server 106 or professional computer 108. There are many systems that provide such coarse maps and GPS locating systems, which are generally called golf rangefinders. The display 123 is a typical display from the Sonocaddie™ range finder available from Sonostar, Inc. Some other examples of range finders are the SkyCaddie available from Skyhawke Technologies, Inc., the GPS Caddie II™, available from iGolf, and the GolfGuru™ available from GolfGuru, Inc. The invention may be integrated with any of these systems as explained below. A typical golf rangefinder system 401 includes software that the client system 104. or server 106 or professional computer 108, uses to generate and display a depiction 400 of the hole that is being played, preferably showing an overhead view. The hole depiction 400 shows the rangefinder location 402 and the relative locations of important terrain features of the hole including the rough 404, the fairway 406, the green 408, and hazards such as a water hazard 410, a sand trap 414, a tree 416 and an out-of-bounds boundary 418. Distances 419 from the rangefinder location to each of the terrain features 417 are displayed. These show that the distance 420 to the back of the green is 590 yards, the distance 422 to the front of the green is 550 yards, the distance 424 to a critical point of the water hazard 410, i.e., the far point of the water hazard along the fairway, is 533 yards, the distance 426 to the leading edge of the out-of-bounds marker 418 is 487 yards, the distance 430 to another critical point of the water hazard 410, i.e., an intermediate point of the water hazard along the fairway, is 402 yards, the distance 432 to tree 416 is 315 yards, the distance 434 to bunker 414 is 275 yards, and the distance 436 to a near point of water hazard 410 is 250 yards. The position coordinates, i.e., the latitude 440, the longitude 442, and the altitude 446 for the current ball position 402 are also preferably shown and preferably recorded and associated with hole depiction 400. Further the date 447 and time 448 may be shown and are preferably also recorded.

Figure 10:
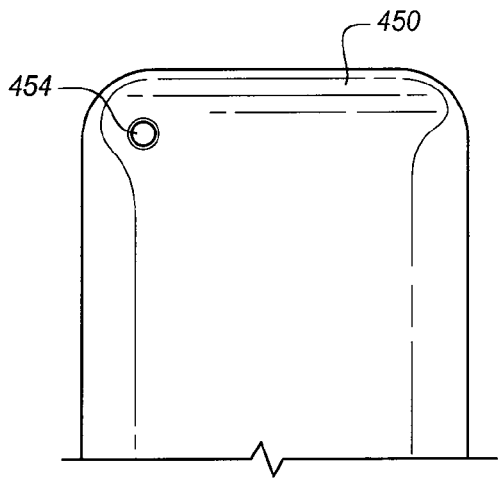
FIG. 10 illustrates a cell phone with camera that may be used to take pictures of the physical situation of the ball.

FIG. 10 illustrates a client computer 104 with camera 130 (FIG. 1) that may be used to take pictures of the ball position. In this embodiment, the client computer 104 is a cell phone cell phone 450 and the camera lens 454 is on the back of the cell phone. This embodiment of a camera is, of course, conventional. However, the combination of the camera with other portions of the invention to create an improved on-the-spot, real-time sports personal coaching system is new. As known in the art, the computer 104 and the camera 130 can take on many forms.

Figure 11:
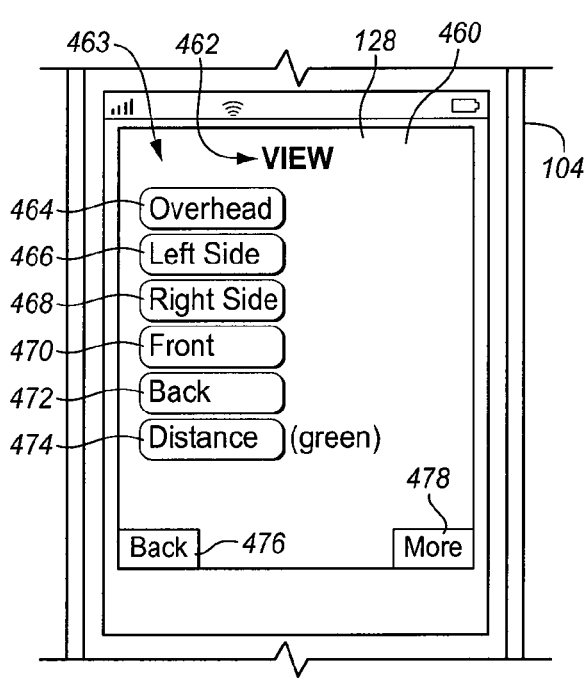
FIG. 11 illustrates a screen that may be displayed on a cell phone to assist the user in communicating with the system of FIG. 1.

FIG. 11 illustrates a screen 460 that may be displayed on display 123 of a cell phone or other client computer 104 to assist the user in communicating with the system server 106 or professional computer system 108. Screen 460 is preferably used to select the view of the ball that is about to be communicated using a picture. The screen 460 includes a header 462 to indicate to the user the screen that is being used. Screen 460 preferably displays a plurality of buttons 463 that indicate various possible viewing positions, including overhead view 464, a left side view 466, a right side view 468, a front view 470, a back view 472 and a distance view 474. Here "green" indicates it is a view of the ball toward the green with the green in the distance. Other views may be indicated by clicking on "more" 478 or the user may return to the previous screen by clicking on "back".

Figure 12:
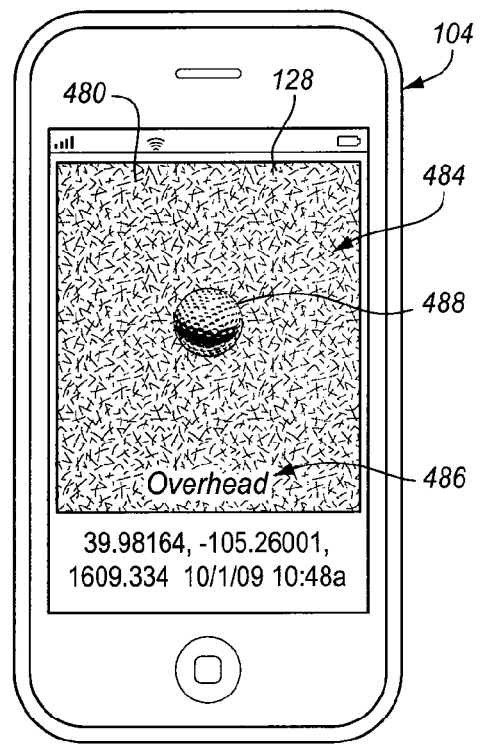
FIG. 12 illustrates a picture of an overhead view of the user's golf ball as may be displayed prior to communicating it to the system.
Figure 13:
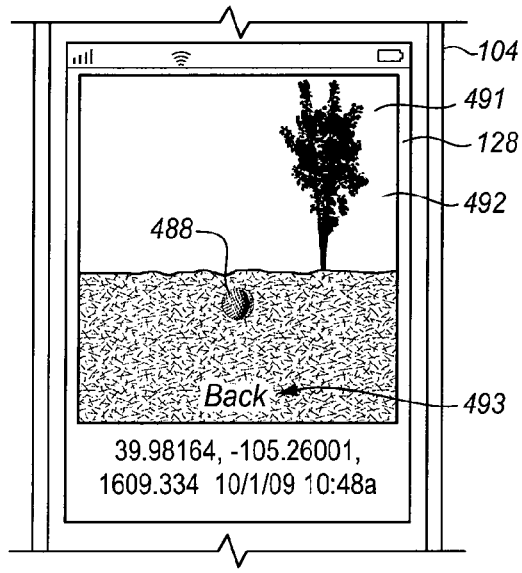
FIG. 13 illustrates a picture of an back view of the user's golf ball as may be displayed prior to communicating it to the system.
Figure 14:
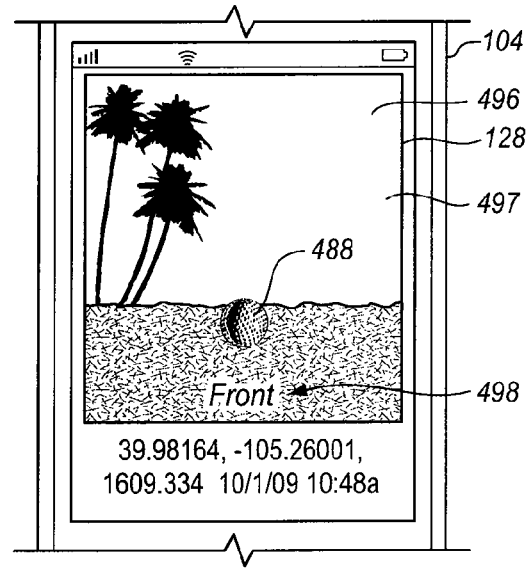
FIG. 14 illustrates a picture of a front view of the user's golf ball as may be displayed prior to communicating it to the system.
Figure 15:
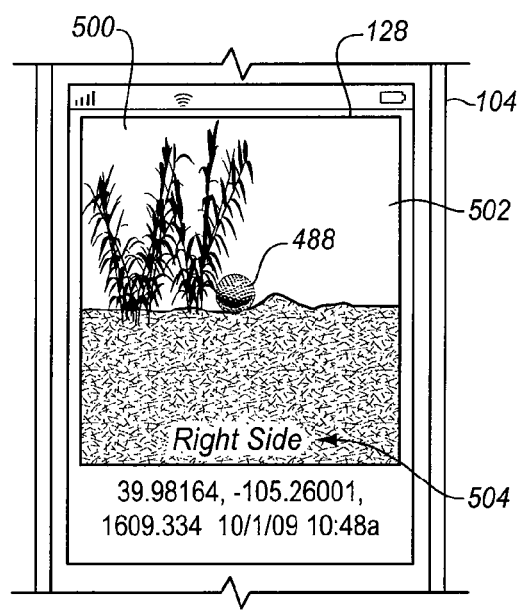
FIG. 15 illustrates a picture of an right side view of the user's golf ball as may be displayed prior to communicating it to the system.
Figure 16:
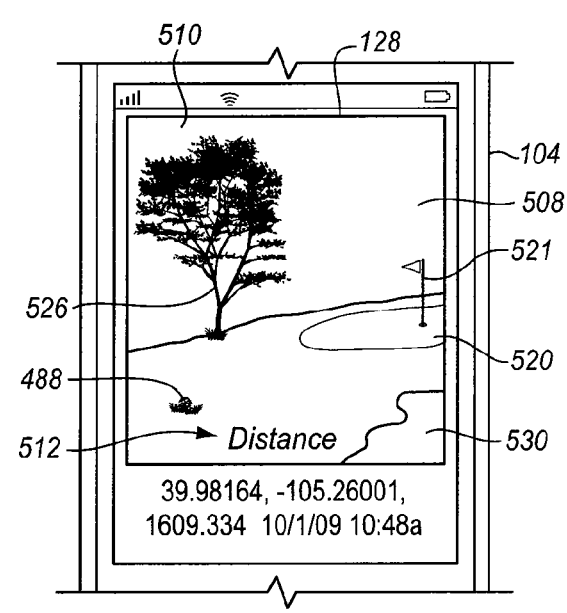
FIG. 16 illustrates a picture of an distance view including the user's golf ball as may be displayed prior to communicating it to the system.

FIG. 12 illustrates a client computer system 104 with the screen 480 displaying a picture 484 of an overhead view of the user's golf ball 488 as may be seen by the camera 454 and transmitted to the server 106 and/or professional computer system 108. Again, we do not show an actual picture but an illustration of a picture because of the requirements for patent drawings. Screen 480 includes a label 486 indicating that the picture is an overhead view.

FIGS. 13, 14, 15, and 16 illustrate a client computer system 104 with the screens 492, 496, 500 and 508 displaying pictures 491, 497, 502, and 510 of a back view, front view, right side view and distance view, respectively, of the user's golf ball 488, as may bee seen by a camera 454 and transmitted to the server 106 and/or professional computer system 108. Each screen 492, 496, 500 and 508 includes a label 493, 498, 504 and 512, respectively, indicating the view in the picture. The distance view may show the green, 520, flag 521, a hazard such as a tree 526 and other features 530 that may be seen by the user, although the picture 510, together with the information on screen 400 (FIG. 9) can be useful even if particular features are not distinct. The particular pictures and views shown in FIGS. 12-16 are not intended to be limiting but merely illustrative of pictures and views that may be taken and communicated. Preferably, whenever any pictures, such as those in FIGS. 12-16, are transmitted to the server 106 and/or a professional computer system 108, the position coordinates where the picture was taken are also transmitted. Preferably, the position coordinates are electronically attached to the electronic copy of the picture and go wherever the electronic copy of the picture goes.

Figure 17:
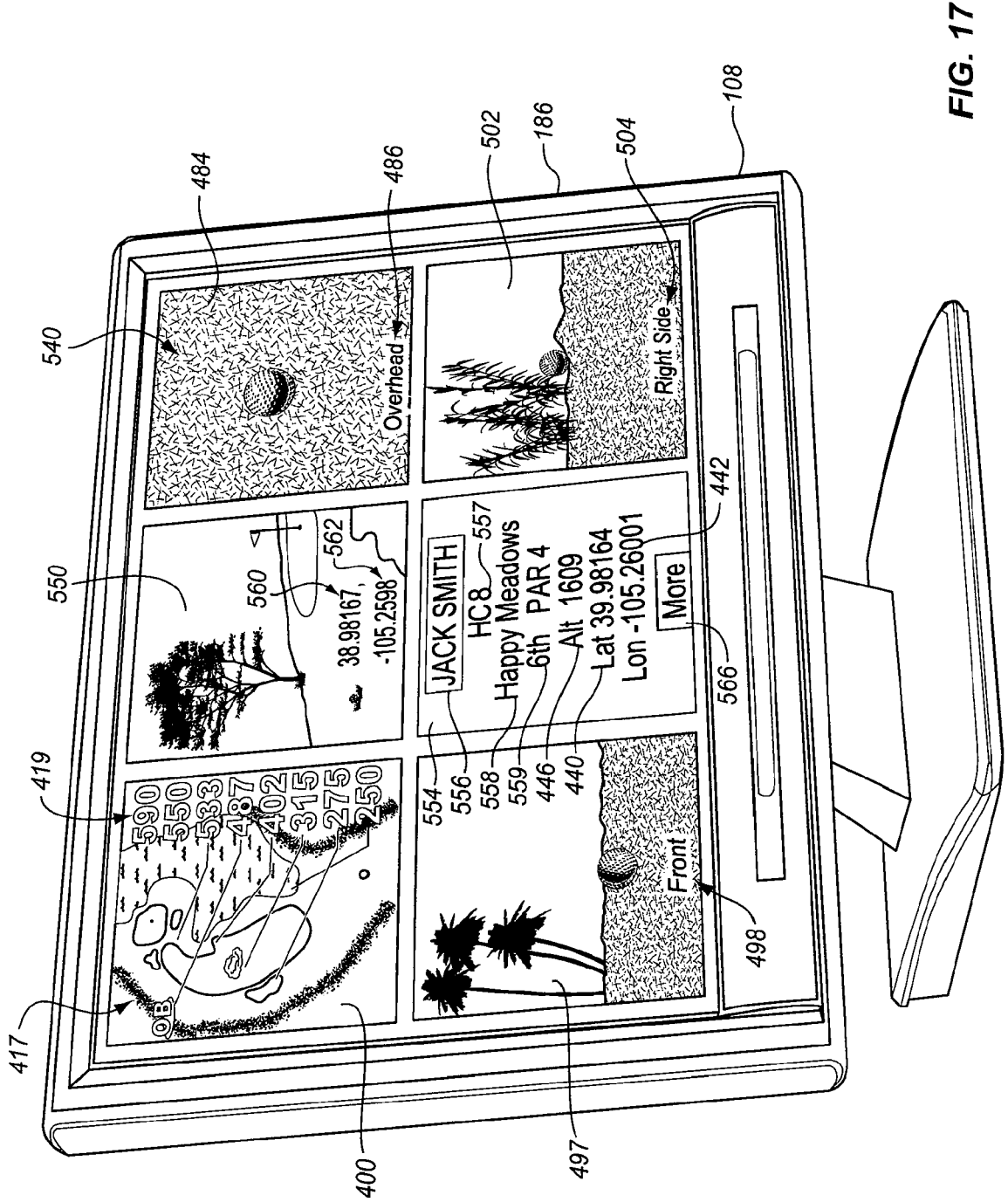
FIG. 17 illustrates a computer display of the information collected by the user as described in connection with FIGS. 9-16 as may be viewed by a professional.

FIG. 17 illustrates an exemplary screen 540 on a display 186 of professional computer 108 illustrating how the information collected by the user as described in connection with FIGS. 9 and 12-16 and information available on the server 106 or professional computer 108 may be viewed by a golf professional. Screen 540 shows hole depiction 400, with terrain features 417 and distances 419, and the pictures 484, 497, and 502. Hole depiction 400 can be uploaded from client system 104, though preferably, only the position coordinates are sent from the client system 104 and the hole depiction is created at the professional screen using these coordinates and the course mapping information that is available on the system server 106 and/or professional computer 108. Preferably, distance pictures, such as 550 taken from many places on the course, together with the position coordinates 560, 562 of the pictures, are also available on the server 106 or professional computer 108. It has been found that only a dozen pictures per hole are necessary to provide coverage of 90% of the physical situations that occur. Of course, the more pictures that are available on the server, the less it is necessary for a distance picture to be taken and transmitted by the user. Preferably, one or more close-pictures, such as 484, 497 and 502, which have been provided by the user, are transmitted from the client computer 104. However, close up pictures that have been uploaded at or near the present ball position may also be available on server 106 and/or professional computer 108. The bottom center portion 554 of screen 540 shows other relevant information, such as the player name 556, the player's handicap 557, the course name 558, the hole and par 559, the altitude 446, the latitude 440 and the longitude 442. Name 556 is a button that links to detailed player information, such as shown in FIG. 2 of the '290 patent, which may be obtained from the player database 644 (FIG. 18) or uploaded from client computer 104. The altitude 446, latitude 440, and longitude 442 are for the current ball location. If a picture, such as 497, is for the current ball location, it does not need to include the position coordinates. However, pictures from the course database 630 (FIG. 18), such as picture 550, include the position coordinates 560 and 562. By comparing position coordinates 440 and 442 with the coordinates 560 and 562, the professional can determine how close to current ball position the pictures from the course database were taken. If the position coordinates 560 and 562 are clicked on, the position coordinates are replaced by the date 447 and time 448 the picture was taken. This information is useful in case the course terrain has been changed since the picture was taken. Based on the position coordinates and the course information stored database 630 (FIG. 18), including course maps, data such as shown in FIGS. 2 and 3, and pictures, a golf professional can quickly analyze the physical situation and provide coaching to the user. A picture or pictures selected by the user, such as those shown in FIGS. 4-8, may provide other useful information. Button 566 brings up other screens which the professional may use to obtain more data and control the system as required.

Figure 18:
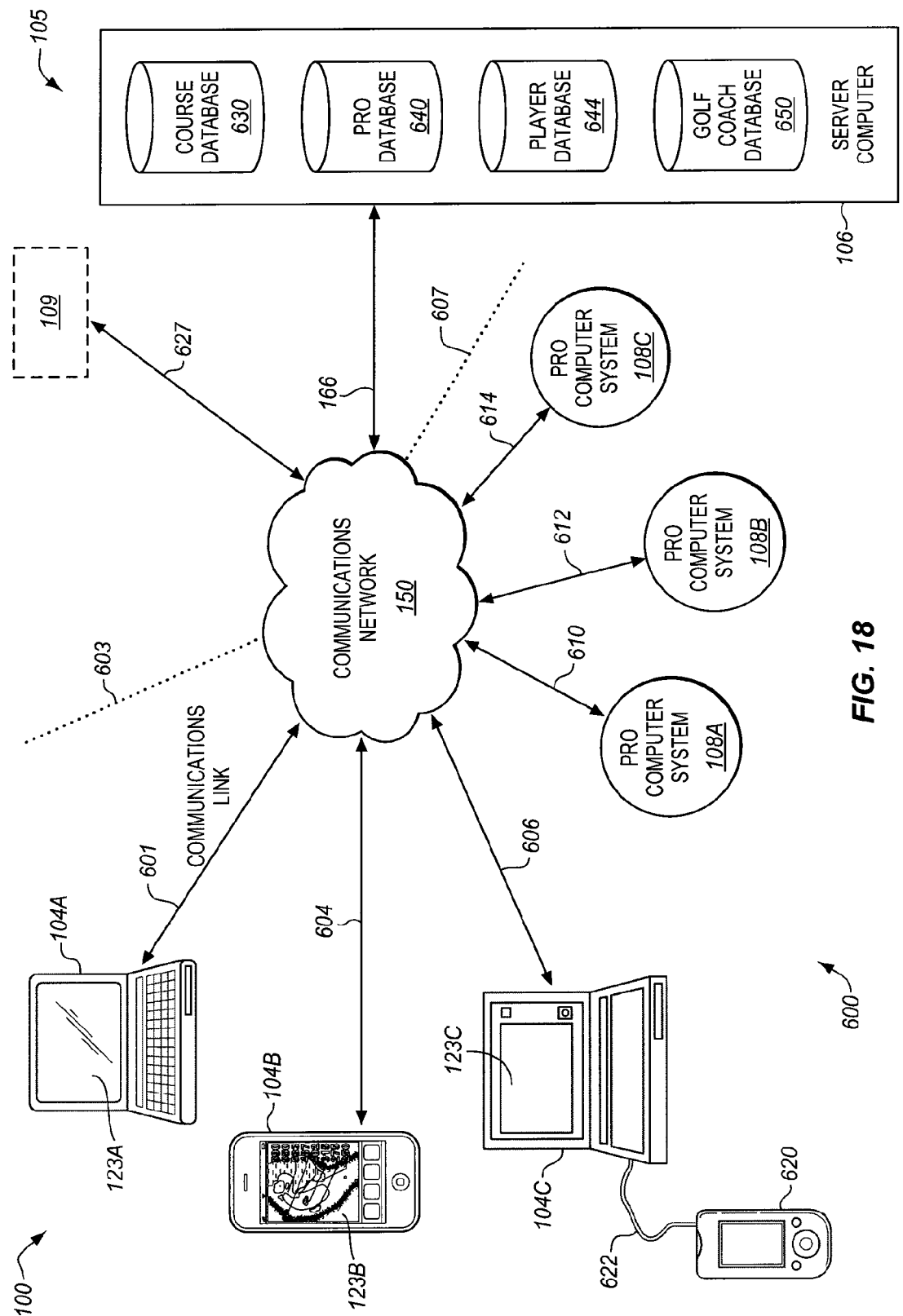
FIG. 18 illustrates the personal coaching system of FIG. 1 according to a preferred embodiment of the invention focusing on the databases of the system.

FIG. 18 shows a personal coaching system 100 according to a preferred embodiment of the invention illustrating some different features than FIG. 1, in particular the databases associated with system 100. System 100 as shown in FIG. 18 includes client computers 104A, 104B and 104C. Client computer 104A is a laptop personal computer, client computer 104B is a cell phone, and client computer 104C is a notebook computer. The invention contemplates that a user could also use a computer mounted on a golf cart, a standard, non-portable PC, MAC or other computer. Each computer 104A, 104B and 104C includes a display, 123A, 123B and 123C, respectively, as well as the other features of a computer. Computer 104C is connected to a range finder system 620 via a cable 622, such as a USB cable, plugged into connector 135 (FIG. 1). Computers 104A, 104B and 104C are connected to communications network 150 via communications links 601, 604, and 606, respectively. The dotted line 603 indicates that many more client computers 104 may be connected to network 150. System 100 also includes professional computer systems 108A, 108B and 108C which are connected to network 150 via communication links 610, 612, and 614, respectively. Dotted line 607 indicates that many more professional computer systems 108 may be connected to network 150. Server computer system 106 is connected to communications network 150 via communications link 626. Server computer system 106 preferably includes at least four databases: a course database 630 that stores data relating to holes, terrain and other information for a plurality of different golf courses, which data includes pictures; professional database 640 which stores data related to the professionals providing coaching via the system 100, player database 644 which stores data related to the users of system 100, and golf coach database 650 which stores preferred actions to take in response to physical factors, which preferably include prerecorded standard descriptions of actions. These databases may be included in the same database system. As indicated above, a plurality of server computers may be connected to network 150, and another server similar or identical to server 106 is indicated at 109 and connected to network 150 via communications link 627. Together, server computers 106, 109 and professional computers 108, 607 provide a golf call center 105.

FIGS. 19-23 and 25 are flow charts illustrating various processes according to the invention that utilize the apparatus of FIGS. 1-18 and 24. It should be understood that these processes are exemplary rather than limiting to the invention. That is, they are presented to illustrate the capabilities of the system 100. Once these examples are understood, those skilled in the art will be able to create many variations and other examples of the processes according to the invention.

FIG. 19 is a flow chart illustrating a system set-up process 660 according to a preferred embodiment of the invention. The process 660 starts at 661 with connection of a client computer 104 to the system 100. At 665, the communication device, e.g., client computer 104A, 104B or 104C, and the user are registered on the system, preferably by entering a user name and password and placing a cookie on the client computer. Personal and set-up screens, such as shown in FIG. 2 of U.S. Pat. No. 6,931,290, are provided to the user at 668. The user may select a preferred professional and alternates as part of this set up. When the user has filled in the information on the personal and set-up screens, it is uploaded to the player database 644. As known in the rangefinder art, the user can purchase and download course data for specific golf courses in the set-up process. At 672 the user takes a picture or video that is uploaded to the system 100 and then sent back to the client computer display to calibrate and test the picture communication system and make sure the user is familiar with the system so it can be used quickly when needed. If the user has registered to use a golf professional, the picture is also sent to the display 165 of server computer and/or to the display 186 of one of professional computers 108 to make sure that part of the system 100 is functional. At 674, course data is downloaded to the client computer memory 121 if that has not already been done in the set-up process 668. The GPS or other locator subsystem 143 is initiated at 678, and when this system is locked on, the starting hole is entered, or, in systems which automatically detect the hole via GPS or other locator, the starting hole is confirmed. Play is then initiated at 688. Any of the processes 665, 668, 670, 672, and 674 may be performed well prior to beginning of play or just prior to a round of golf.

FIG. 20 is a flow chart illustrating a preferred embodiment of a process 700 according to the invention that may be used for consulting with a golf professional about a round of golf that has been recorded and stored by the system 100. The process 700 is started at 702, which may include some or all of the subprocesses in process 660. The round of golf is played and the game data including data entered as discussed in FIGS. 2-16, including pictures of lies or other relevant pictures are stored at 706. This recording can conveniently be performed simultaneously with normal use of range finder systems know in the art. For example, a range finder such as 620 (FIG. 18), or a cell phone 104B with a rangefinder application, normally locates the position on the course of the ball before each shot. If it is a second or third shot, this step also locates where the last shot landed. If a picture is also taken of the lie before each shot, and the position and picture are recorded, then the system has stored all the information required to completely describe the round played. We shall refer to this herein as the "round data". The storage of the round data can be performed automatically each time the player indicates that the ball has been located, and the picture can be stored with the location information as soon as it is taken. The round data can be stored in memory 121 of the client computer and uploaded to the player database 644 at the completion of the round, or uploaded automatically as soon as it is recorded. For a system that does not have full telecommunication instrumentation, such as a conventional rangefinder 620, the round data can be uploaded by connecting the range finder 620 to a computer, such as 104C in FIG. 18, that does have telecommunication capability, and uploaded via the computer. Either before or after the uploading, the user may select a professional at 714, or the professional may be selected by the system call center system 105, and communication initiated with the professional at 718. At 720, the personal data of the specific user is downloaded to the selected professional computer system 108, if the professional does not already have it. The round data or other game data, such as data recorded on a driving or putting range, or other practice area, are downloaded to the selected professional at 724, and preferably displayed as shown in FIG. 17. The user and the pro communicate regarding the round or other game data at 728 and the professional provides coaching. The coaching session ends at 730, at which time the coaching provided may be uploaded to the player database 644.

Figure 21:
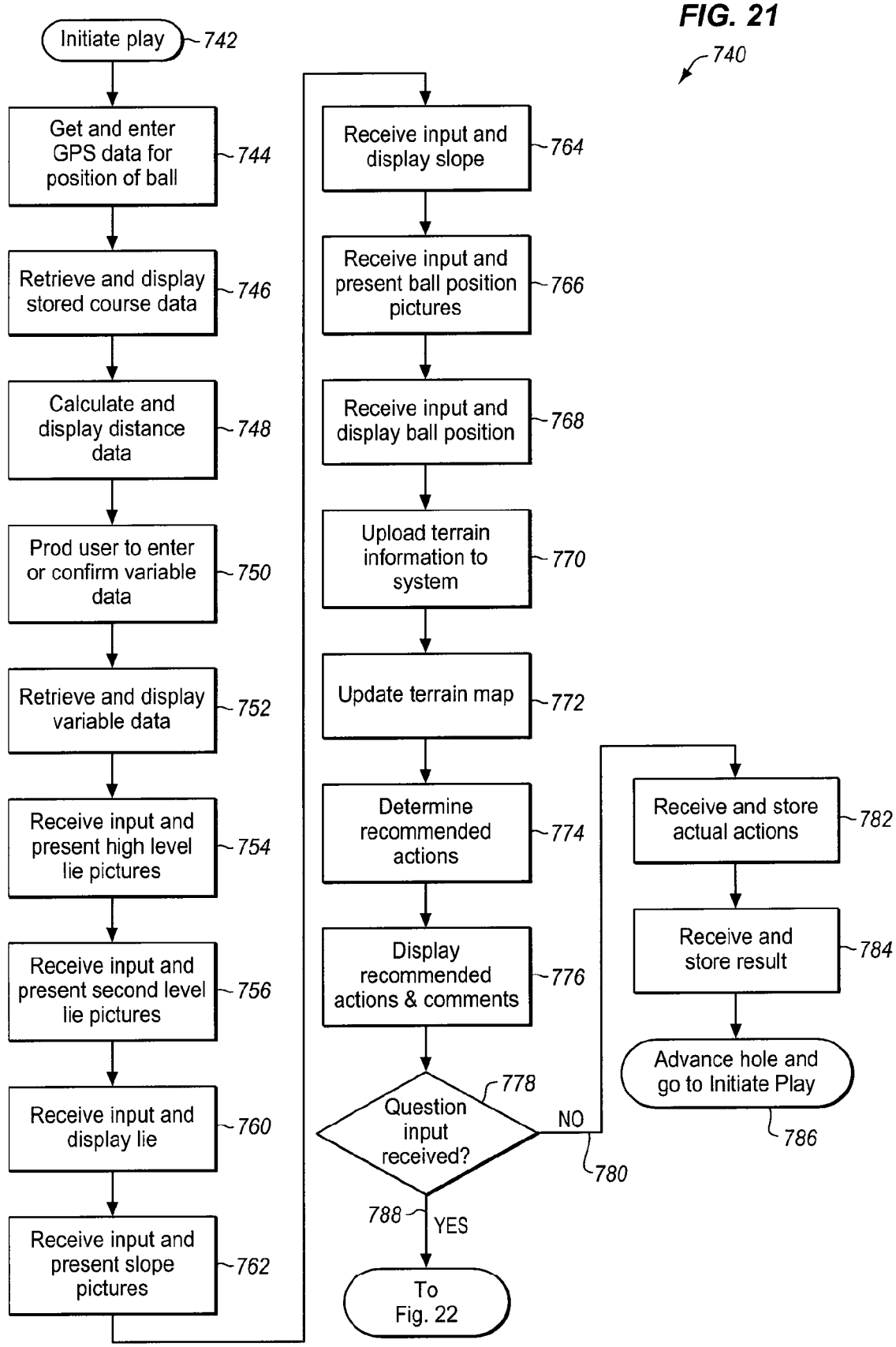
FIG. 21 is a flow chart illustrating a preferred embodiment of a process according to the invention for providing personal coaching via an electronic coach while the user is playing golf.
Figure 22:
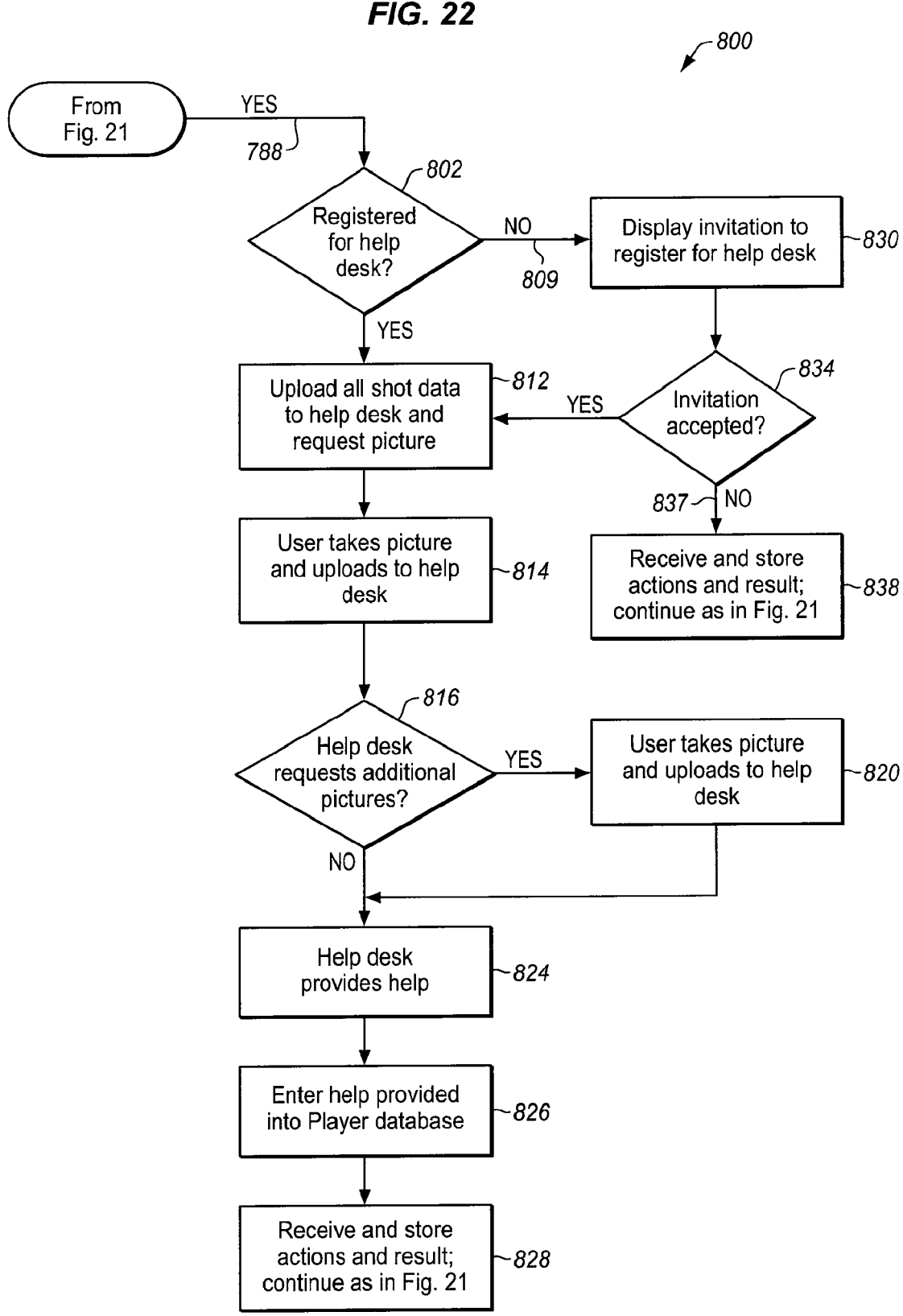
FIG. 22 is a flow chart illustrating a preferred embodiment of a process according to the invention for providing personal coaching via a help desk when the user faces a particularly difficult decision while the user is playing golf.

FIGS. 21 and 22 are flow charts illustrating a preferred embodiment of processes 740 and 800 according to the invention for providing personal coaching while the user is playing golf. FIG. 21 illustrates preliminary processes and a process that provides coaching via the golf coaching database 650, while FIG. 22 shows a process 800 for providing coaching via a golf professional. Turning to FIG. 21, play is initiated at 742, preferably with process steps as discussed above, including downloading the course data. At 744, GPS or other locator system data is acquired and entered for the position of the ball. This data is preferably entered in the client computer memory 121, server memory 163, and/or professional computer memory 182. As discussed above, much, if not all, information necessary for providing coaching may be available at the server 106 and golf professional computer 108 simply by their having the location coordinates of the ball. The course data, such as 417, is retrieved from memory 121 or other source and displayed at 746. Then, at 748 the distance data, such as 419 is displayed. The client computer 104 then prods the user to enter or confirm the variable data, such as data shown in FIG. 3. The data shown in FIG. 2 is preferably automatically entered in process 746, but may also need to be entered or confirmed. The variable data is received by the system and displayed in process 752. If the user clicks on one of buttons 250 (FIG. 3), this input is received and the corresponding high level pictures, such as 260, 350, or 375 (FIG. 4, 7 or 8), are displayed. If the user has clicked on the lie button 252 and one of the pictures 260 most like the lie, the input is received by the client computer 104 and the requested second level lie pictures, such as 303 or 333 (FIG. 5 or 6) are displayed in process 756. After the user selects the lie picture most like the current ball position, this input is received and the lie is displayed in process 760. If the user clicks on the button 254, this input is received by client computer 104 and the slope pictures, such as 350 are displayed in process 762. When the user clicks on one of the pictures 350, this input is received by client computer 104 and the slope is displayed at 764. If the user clicks on physical situation ball position 256, the ball position pictures, such as 375, are displayed and in process 766. When the user clicks on one of pictures 375, this input is received by computer 104 and the ball position is displayed in process 768. The entered terrain information, such as the condition of the rough or slope, is uploaded to the terrain mapper 167 in process 770 along with the position coordinates, then is analyzed, and entered into the terrain map in the course database 630. At 774, all the physical factors relating to the current position of the ball are preferably uploaded to the server 106 and the golf coach database 650 is utilized to determine the recommended actions. All or part of his process may also take place in client computer 104, if the memory of the client computer is big enough. At 776, the recommended actions and comments are displayed on the display 123 of the client computer.

At 778, the user can either accept the recommendations, or indicate that he or she has a question or otherwise indicate that he or she would like further coaching from a golf professional. If there is no question or request for interaction with a golf professional, the process 740 flows through 780 to process 782 where the user may enter one or more details of the user's actions, which are then stored in the player database 644 or stored in memory 121 and later uploaded to database 644. The user may also chose to enter the result of the actions, i.e., the result of the shot, which is then received and stored, preferably in player database 644 either directly or via memory 122, in process 784. At 786, the hole is advanced, either manually or automatically as known in the art of range finders, and the process 740 returns to initiate play 742 or directly to one of the processes 744, 746 or 750. Preferably, entering the result at 784 automatically enters the ball position for the next shot, and so 744 and 748 may be done automatically, and the system can go to process 750.

If the user indicates that he or she has a question or requests help from a golf professional, the call center system 105 proceeds to process 800 in FIG. 22 via 788. The process 800 first uploads the user ID and checks at 808 to see if the user is registered for the help desk. If the user is not registered, the system proceeds via 809 to process 830 where and invitation to register for the help desk is displayed. This invitation can include links to description of what the help desk provides and how it can assist the user to learn golf. If the invitation is not accepted, the system proceeds to process 838 at which the actions advised are stored and, when the next position is entered, the system returns to process 784, the result is recorded in the player database 644 and process 740 continues as in FIG. 21. If the invitation to register for the help desk is accepted, the user is registered, or if the user is already registered at step 802, the system proceeds to process 812. At process 812, all of the data on the prospective shot is uploaded to the call center 105 help desk, and the user is connected via phone to the professional at the help desk. If the user has a cell phone camera or other camera that can transmit via network 150, the user may be requested to take a picture or pictures of the position of the ball as described in reference to FIGS. 11-16 and these are uploaded to one of the professional golfer computers 108A-108C that is associated with help desk, preferably via server computer 106. If the professional golfer needs additional information, such as additional pictures, this information is requested at 816 and at 820 the user provides the requested pictures or other information. At 824, the help desk professional provides help, at 826 the help provided is entered by the professional into the user's record in the player database, the user takes his or her shot and when the next position of the ball is recorded, the actions taken and the result is received and stored in the player database 644 and the process 740 continues as in FIG. 21 until the game is completed.

Figure 23:
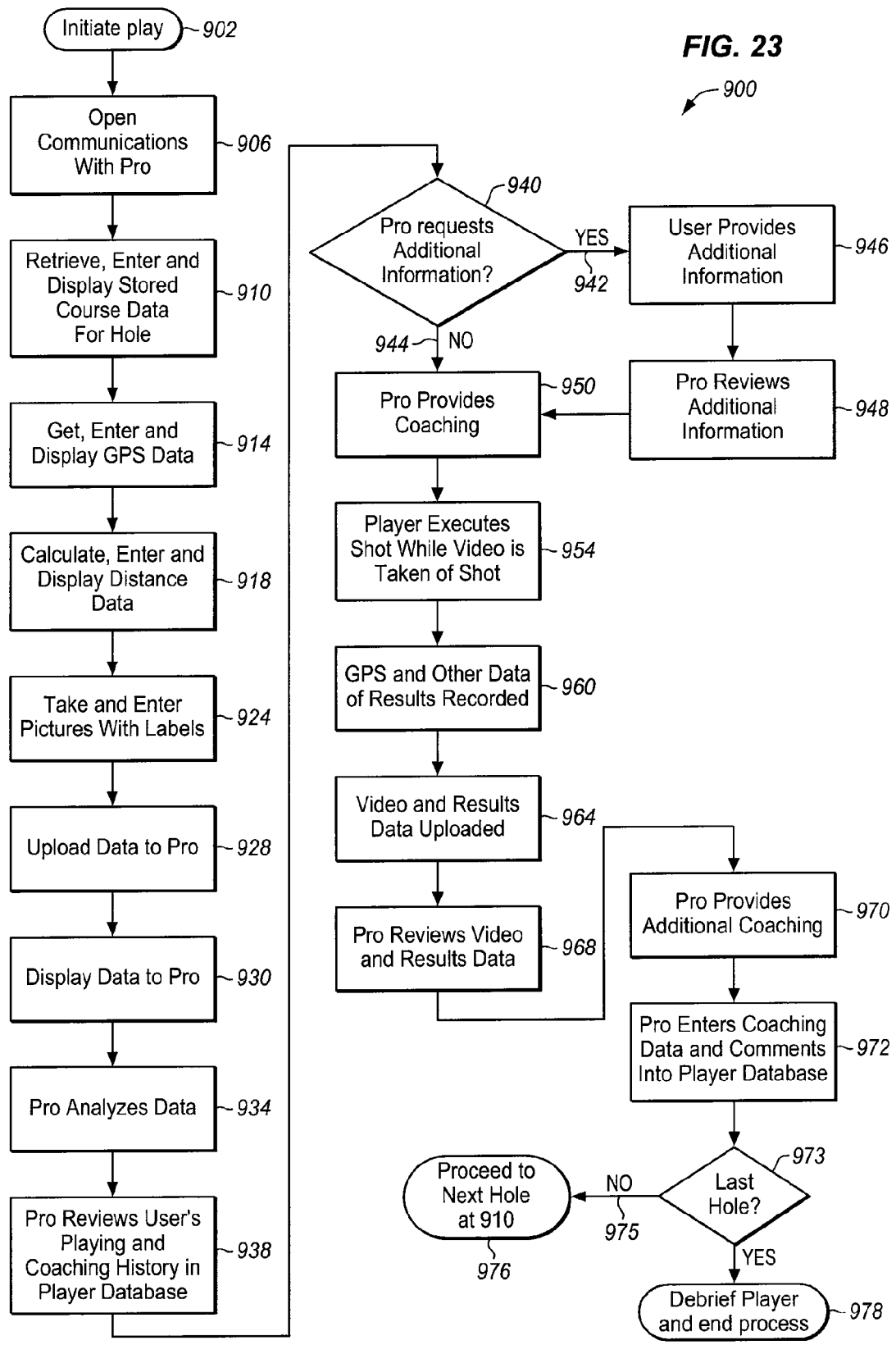
FIG. 23 is a flow chart illustrating a preferred embodiment of a process according to the invention for providing personal coaching from a golf professional while the user is playing golf.

FIG. 23 is a flow chart illustrating a one preferred embodiment of a process 900 according to the invention for using the system of the invention for obtaining personal coaching from a golf professional while the user is playing golf. At 902 play is initiated as discussed above. Communications with the call center 105 and the professional computer 108 selected by the user or call center may be opened at 906, or this step may be delayed until the user needs assistance. At 910, the stored course data for the hole is displayed. Some of this data may be entered using pull down menus or by selecting pictures as discussed in connection with FIGS. 2-8. Or, it may be retrieved from server 106 or directly from memory 121. The GPS or other locator data is retrieved and entered at 914. The GPS or other locator data may be uploaded at once to the server 106 and/or professional computer immediately, though in this embodiment, it is preferably uploaded later. At 918, the distance data 419 (FIG. 9) is calculated, entered, and displayed. In some embodiments in which the locator data has already been uploaded, the calculating may be done at the server or professional computer and downloaded to the client computer 104, particularly if this is faster. At 924, pictures as discussed in relation to FIGS. 12-16 are entered, with labels, such as those indicated by buttons 463 (FIG. 11) identifying the pictures. At 928, the data is uploaded to the professional computer, and at 930 the data is displayed at 930. The professional analyzes the data at 934, and usually will also consider the users paying and coaching history in the player database at 938 before, during and/or after reviewing the data. The professional may request additional information at 940, and, if so, the process 900 proceeds via 942 to 946 where the user provides the additional information, then proceeds to 948 where the professional reviews the additional information, then to 950 where the professional provides coaching. If the initial data and the player's information is sufficient, the process 900 proceeds directly from 938 to 950. At 954, the user executes the shot, and preferably, a picture, preferably a video, is taken of the shot. At 960, the GPS data of the next ball position and any other data relating to the shot are recorded, and the picture, such as a video, and the results data is uploaded to the player database and the professional computer 108 at 964. At 968, the professional reviews that picture, such as a video, and the results data and then, at 970, the professional provides additional coaching. At 972, the professional enters the coaching data and any comments into the player database. At 973, if there are other holes to play, the system proceeds via 975 to the next hole and goes to process 910. If this was the last hole, the system proceeds via 974 to process 978 where the player is debriefed, that is, has an opportunity to enter comments about the coaching and/or the round, either via menus or via a discussion with a follow-up call center person, which follow-up information is preferably entered in the player database 644, the professional database 640, or both, and the golf round ends.

Figure 24:
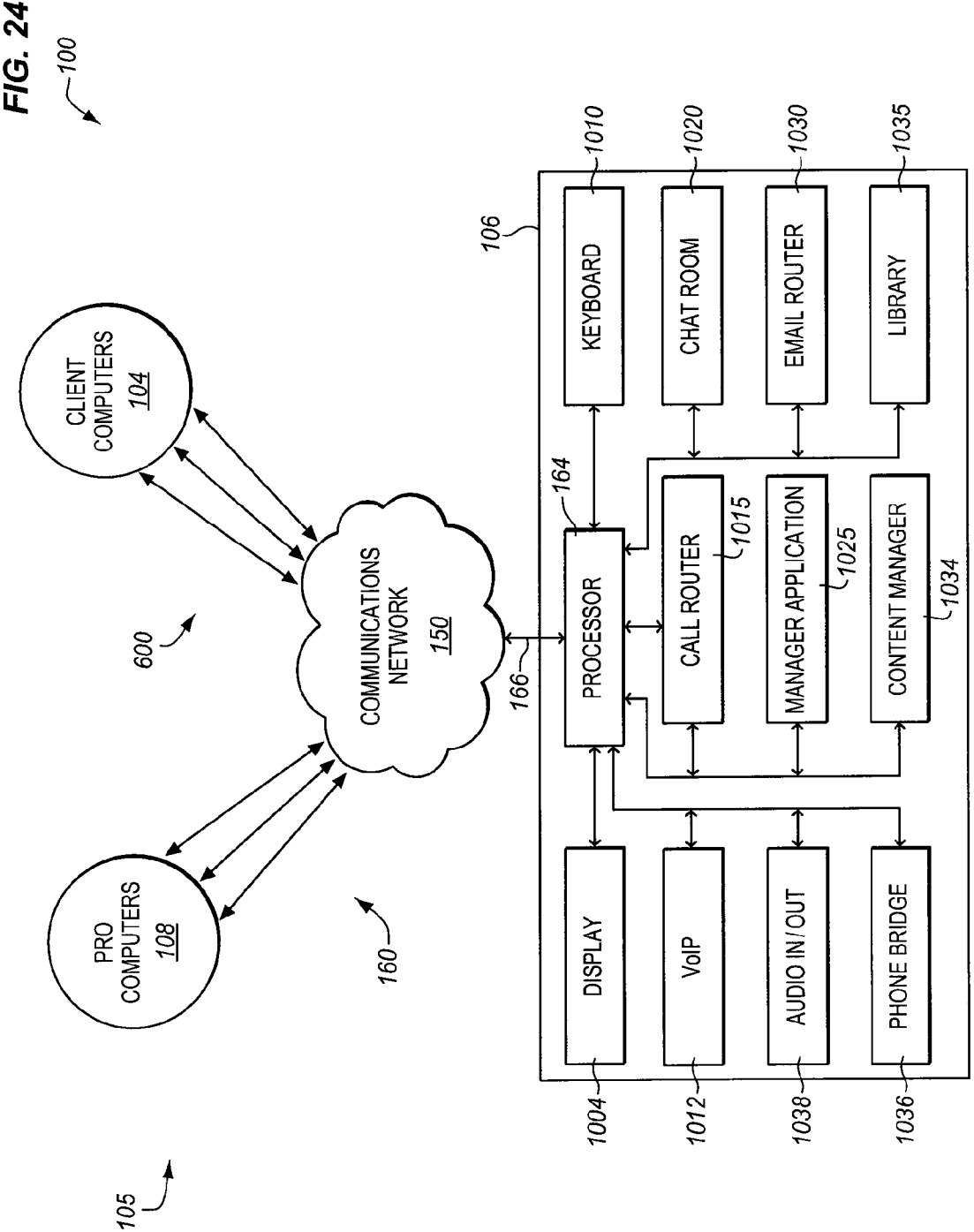
FIG. 24 is another block diagram of system according to the invention, focusing on the fact that the professional computers, communication network and server provide a call center according to the invention.

FIG. 24 is another block diagram of system 100, focusing on the fact that the professional computers 108, communication network 150 and server 106 provide a call center 105 according to the invention. Client computers 105 connect to call center 105 via communication links 600 and communications network 150 as discussed in connection with FIGS. 1 and 18. Professional computers 108 connect to call center computer 106 via links 160 and network 150 as discussed in relation to FIGS. 1 and 18. Call center server 106 connects to network 150 via communication link 166. Call center server 106 comprises processor 164, display 104, keyboard 1010, VoIP (Voice Over Internet Protocol) system 1012, call router software 1015, chat room software 1020, audio input and output 1038, which preferably is a headphone set with microphone, call center manager software 1025, email router software 1030, phone bridge 1036, content manager software 1034, and golf coaching and instruction library 1035. Preferably, the email routing system is IMC, and the VoIP router is CSUI. Preferably, the professional computers 108 all have a standard operating environment, comprising a desktop PC, call center software and VoIP phone and headset. The professional may specialize in particular aspects of the sport, such as putting, the short game, sand hazards, pitching or chipping. Every call is followed with a satisfaction survey. Every system generates reports that are reviewed by mangers to the end of improving customer satisfaction and productivity and lowering costs.

Preferably, golf professionals notify the call center server when they are checked into the system and ready to accept a call, and again notify the server when they check out. In this manner, the call center server knows which professionals are available and does not use valuable time in determining this after a call is received.

When a player calls the call center 105, the player identification and the location data is uploaded to the server. The server application 1025 matches the player to a golf pro. More specifically it determines which golf pros are currently available and whether there is an available professional who is not currently on a call who the player has worked with previously and who the player has rated highly. Building relationships between users and specific golf pros helps build the business and drive customer satisfaction.

The golf pro application preferably initiates with an email and/or text message which alert the golf pro that the player is ready for a consult, and the message body links to a web page from the player database 644 containing the user's info, i.e. profile information, profile data, and call history, as well as the mapped location identifying course and hole. The golf pro follows the link, looks over the player info and presses a button to initiate the call so he or she can begin speaking on their headset. This can be done either from their desk or their mobile phone and ideally should take just seconds to review. While a professional computer is being selected and contact initiated, the course information is retrieved. The course information is transmitted to the professional computer as soon as connection is made to the professional computer. Alternatively, the course information is already in the professional computer, the location information is transmitted to the professional computer as soon as connection is made and an overhead view of the hole with the distance information 419 is generated from the course information and the location coordinates. Other data in the client computer 104 that is relevant to the present physical situation, such as pictures, which may be photos, or, if the call is after a round of golf, the data for the entire round, is uploaded to the server, while the professional is reviewing the player data and the distance data.

At this point, the pro and the player are connected over the phone bridge 1036 and talk over the situation. If additional pictures or other data generated at the client computer 104 can be helpful, that may be uploaded to the professional. The pro coaches the player through the shot, and leaves them happy. The golf pro can conference another golf pro or their manager during any part of the call. Once the golf pro or the player terminates the call, the golf pro becomes available for the next call, though the invention contemplates that particularly skilled professionals may be able to handle a plurality of calls at the same time.

Following a certain amount of time after the call, perhaps two hours, without any calls, the user receives a message with a link to a satisfaction survey. This survey joins the survey results to the user's profile and the golf pro's profile for reporting purposes.

The calls are routed through a telephony bridge 1036 which can route calls. For example, when the golf pro gets an email or text message, the golf pro calls the bridge, the bridge routes the player to the golf pro and/or vice versa, and also records every interaction for the manager application 1025. The manager application also knows when the calls have ended indicating that the golf pro is available for additional coaching. The manager software includes a subroutine for dropped calls so the player and pro can reconnect quickly if the end of the call was not intentional. Preferably, the golf pro indicates the end of the call with a DTMF (Dual-tone Multi-frequency) key sequence recognized by the bridge to indicate to the telephony bridge that the call is over.

In an alternative preferred embodiment, the player may call the call center prior to the golf game and preset a connection to a golf professional, preferably a professional with whom the player has a previous relationship. The connection can be placed in an inactive state, but can immediately be reopened when the player wants coaching. In this alternative, it does not matter whether or not the golf professional is on another call. Experienced golf professionals can handle several calls at once, and smoothly transition from one call to the next. Golf players usually like to have assistance quickly so that they do not retard play, so they appreciate a fast response. In addition, to speed up the response process, much of the response to the player can be canned, or prerecorded. That is, once an experienced professional determines what the club and shot should be and informs the player, the standard information as to most of the other action items, such as club face, grip, body position, stance, ball position, weight, and swing often follow. These can be downloaded to the player's portable computer, e.g., smart cell phone. If some of these must be varied because the player is on a slope or the shot involves other physical conditions that require modification of one or more of actions, an experienced professional can click on adjustment buttons on his screen that provide prerecorded variations to the standard response.

The manager application is a web page with a series of sub-pages which show all active golf pros, a complete call history with historical summary reporting, a list of golf pros currently available and currently consulting with players, and links to recordings of each historical call. The manager has weekly, monthly and annual management meetings which may require summary reporting. The manager application preferably includes a dispatcher function which enables it to route incoming players to specific golf pros. Preferably, it also provides summary reporting for surveys.

Preferably, the phone bridge software is one of the applications described at the following web sites: http://www.asterisk.org, http://gizmo5.com/pc, and http://www.skype.com, http://www.skype.com/allfeatures/callphones. SKYPE based call center software can be found at: http://www.prettymay.net. SKYPE-specific phone hardware can be found at http://www.amperordirect.com/c/c-amperorvoip/index.html. Reliable VoIP phones are available from Cisco Systems, Inc., 170 West Tasmar Dr., San Jose, Calif. 95134. Any cell phone with a web browser is sufficient for the player application. Any cell phone with a good web browser and a Bluetooth headset may be used for the golf pro application. Arrangements can be made with cell telephone providers for lower bulk rates. Alternatively, with many cell phone communication providers, the user can designate multiple telephone numbers as phone numbers for which no charge is made, for example "My Faves™" with T-Mobile and "Friends & Family™" with Verizon Wireless. If the call center number, or alternatively, the professional telephone number, is selected as one of these numbers, the calls to the call center and professional computer can be made at no charge.

Figure 25:
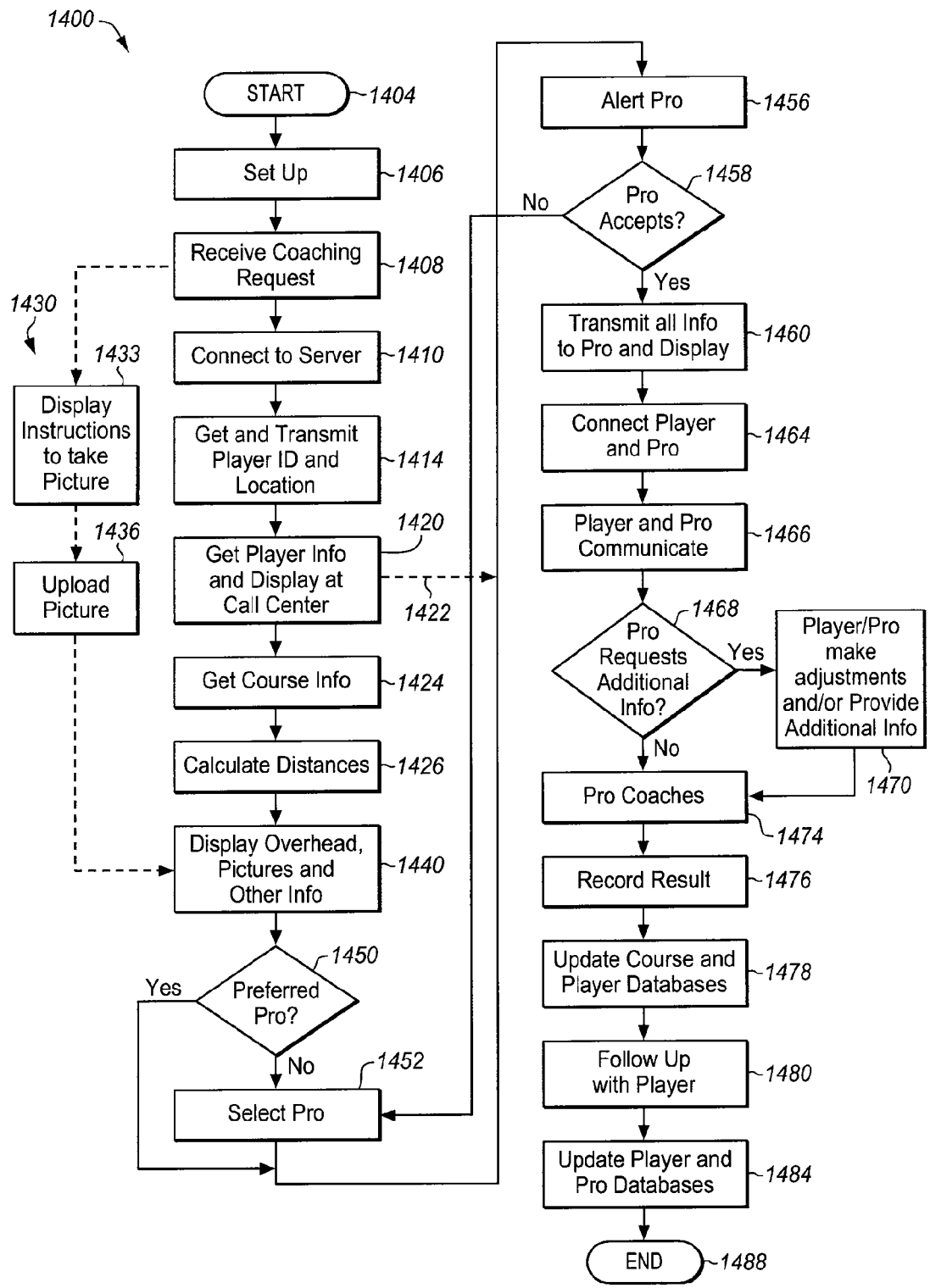
FIG. 25 is a flow chart illustrating a preferred embodiment of a process according to the invention for providing personal coaching via a golf call center system.

FIG. 25 is a flow chart illustrating a preferred embodiment of a process 1400 according to the invention for providing personal coaching via a golf call center system 105. The process starts at 1404 and a setup subprocess may be performed at 1406, for example as discussed in connection with FIG. 19. This setup process may include placing the client computer 104 in a mode in which taking a picture is an indication that professional assistance is required, by placing an initial call to the call center to inform the call center that the player is active and will want coaching from a professional, and preferably a particular professional, and other subprocesses. A coaching request is received at 1408. The coaching request may be initiated at client computer 104 by entering the phone number of the call center or a professional, by taking a picture which, by prior setup is an indication that professional help is needed, or any other suitable input to client computer 104. At 1410, the client computer connects to server computer 106. At 1414, the client computer transmits the player identification (ID) and the current location of the client computer. The player ID is used by server 106 to query the player database 644 and get the player data and the data is uploaded to the call center server computer 106 at 1420. At 1424, the system uses the location data to get the course information, which preferably includes the map of the hole, one or more pictures of the hole taken near the location, and other data such as the speed of the green, wind speed, course conditions and overhead satellite view of the hole, such as is available on Google™. At 1426, the hole map and location are used to calculate the distances 419. In the preferred embodiment, the coaching request at 1408 also initiates a process 1430 which processes in parallel with subprocesses 1410, 1414, 1420, 1424 and 1426. Process 1430 includes the display of instructions on client computer display 123 requesting the user to take a picture of the current position of the golf ball. When the user complies and takes a picture, the picture is uploaded to the server 106 at 1436. The process 1400 proceeds to subprocess 1440 where the system displays a rangefinder type overhead view such as 400, and any other pictures and information available to the system, including any pictures taken by the player. If the player information or set up information includes a preference for a particular professional, the decision tree 1450 goes to 1456 to alert the particular professional. If there is no preferred professional, the server 106 selects the professional based on the player history, the particular course and other available data. If the player prefers a particular professional, the professional may be alerted immediately after the player information is obtained as shown by the dotted line 1422. Further, in one embodiment, the professional may be designated at set up 1406 and the player may immediately connect to the professional at or near the start of the round and remain connected throughout the round. If the selected professional is not available or otherwise does not accept the assignment at 1458, the system returns to 1452 an another professional is selected either by the system or the user. At 1460, all the available data regarding the shot to be made is transmitted to the professional and displayed on the professional computer, such as shown in FIG. 17. At 1464, the player and professional are connected, preferably via telephone and internet, though this can also be by either one, or by some other preferably direct communication method. This subprocess 1464, like other subprocess in this process 1400, may be performed earlier. When the player and professional are connected, they communicate to discuss the situation. The professional should determine immediately that the player is the one indicated in the player information and should make sure at the outset that all the pictures and other information is accurate, or whether changes should be made. If the professional needs different or additional information, as indicated at 1468, the professional and/or the player make the appropriate inputs and provide the additional information at 1470. When the adjustments have been made and additional information is provided, or if no adjustments or information is needed, the process 1400 proceeds to 1474 where the coaching is provided by the professional. The player then makes the shot, and, when the next location of the ball is entered, the position and other result, such as a hook or a slice, are recorded at 1476, and the course and player databases are preferably updated at 1478. At 1480, the call center 105 makes an appropriate follow-up communication with the player, and the information acquired by the follow-up are entered into the player and professional databases 644 and 640, respectively. The process 1400 ends at 1488.

Figure 26:
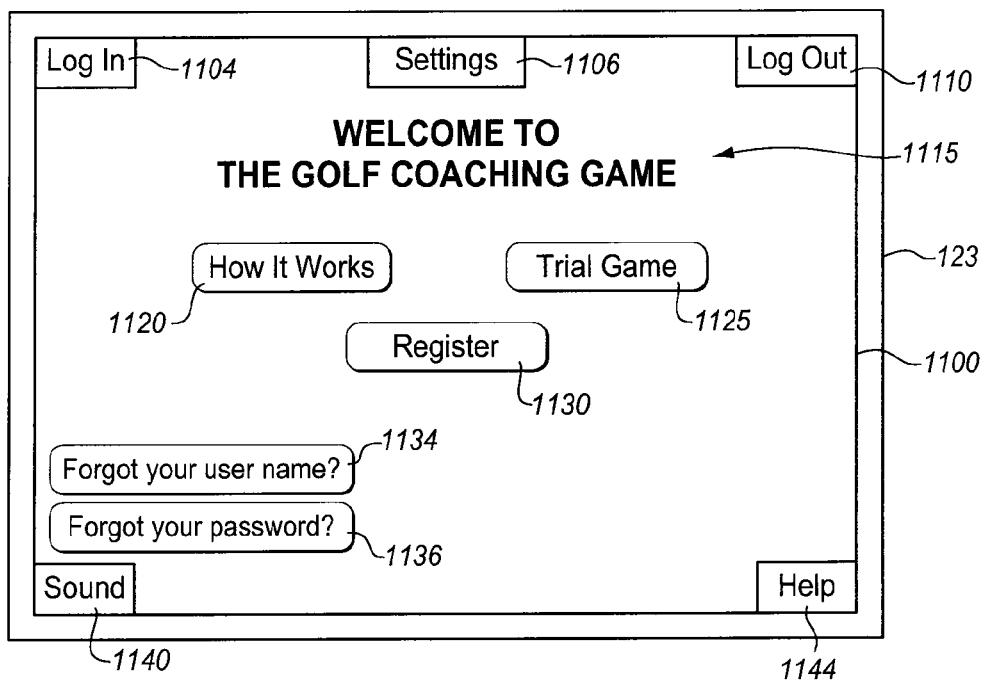
FIG. 26 illustrates an exemplary embodiment of a home screen or a golf instruction web site or program according to the invention.

FIGS. 26-29 relate to a further aspect of the invention, i.e., a web site or software application on which users may practice the judgmental aspects of golf or get coaching in the judgmental aspects of golf. That is, this embodiment may be either accessible by a web site, or it may be sold on a CD, or downloaded to a computer memory and be a self-contained game. FIG. 26 illustrates an exemplary embodiment of a home screen 1100 of a golf instruction web site or game according to the invention. Screen 1100 is displayed on the display 123 of a client computer 104 (FIGS. 1 and 18). Preferably, client computer is a PC or Macintosh computer, though it may be a lap top, smart cell phone or any other computer. Home screen 1100 includes a login button 1104, a settings button 1106, and a logout button 1110, the functions of which are known in the art. A welcome greeting 1115 announces the game. A "How It Works" button links to an explanation of the web site or game, which is preferably interactive. Button 1125 links to a trial game to introduce the user to the benefits of the system. Button 1130 allows the user to register and pay for the service. Buttons 1134 and 136 link to assistance if the user has forgot his or her username or password, respectively, which assistance is known in the art. Button 1140 provides a convenient link to adjust the sound on the computer, and button 1144 links to help with the program or web site.

Figure 27:
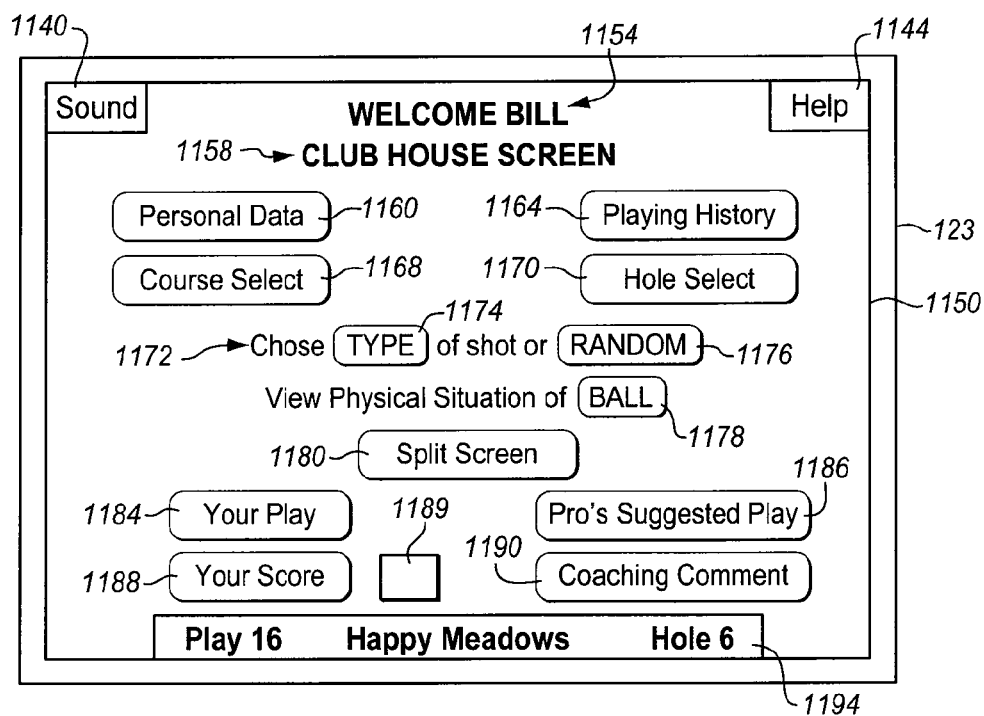
FIG. 27 is an exemplary embodiment of a "club house" or home base screen of the golf instruction web site or program according to the invention.

FIG. 27 is an exemplary embodiment of a "club house" or home base screen 1150 of the golf instruction web site or software application according to the invention. Screen 1150 is displayed on the display 123 of client computer 104. This screen displays on connection to the site if the user has registered for the service. The screen 1150 includes a welcome message 1154 addressed to the registered user and an identification message 1158 for the screen. Button 1160 accesses a personal data screen as discussed above. Playing History button 1164 links to a history of the registered user in previous uses of the system. Course select button 1168 allows the user to select the course on which the game will take place, and button 1170 allows the user to select the hole on which the game is played. Once the course and hole are selected, the name of the course and number of the hole, respectively appear in place of the select buttons. Clicking on button 1172 brings up a screen (not shown) on which the user can chose the type of shot he or she wants to practice, e.g., short iron, pitch, chip, etc., or select a random shot type as selected by the system. If the user selects a specific type of shot, the user can choose to practice generally in the category and the system will present physical situations that will permit practice of that category of shot. Alternatively, the user can elect to open screens similar to those shown in FIGS. 3-8 and customize a practice physical situation. When the type of shot is selected, the shot type is displayed at 1174, while if a custom golf ball physical situation is selected, the word "Custom" appears at 1174. In either case, the word "Random" in box 1176 is faded to a light gray. If a random selection of shot types is selected the word "Random" is bolded in box 1176 and the word "type" in box 1174 is faded. Button 1178 links the user to the physical situation that is presented. This brings up pictures such as shown in FIGS. 4-16 which show the physical situation the user has to solve. Preferably, if the user's screen is large enough, multiple pictures are shown on the screen, such as shown in FIG. 17. Button 1184 allows the user to choose his or own solution to the physical situation, i.e., the shot that the user will play. Here, the term "shot" includes all the action items that define the response the user will make. This will be described in more detail below. Button 1186 links to an expert's, e.g., a golf professional's, solution to the physical situation, that is, the shot the professional would take, which will also be discussed in more detail below. Button 1184 links to a screen that shows both the physical situation, such as screen 1200 of FIG. 28 below. Button 1188 connects to a link that evaluates the player's responses, and a score representative of the user's responses is shown in box 1189. Button 1190 opens a link to a more detailed critique of the player's responses. Box 1194 labels the current physical situation that is being played, the course and the hole. Numbering each situation allows the user to more easily keep track of which examples he or she has played. If a custom golf ball physical situation is being played, then the word "Custom" replaces the "Play 16" designation.

Figure 28:
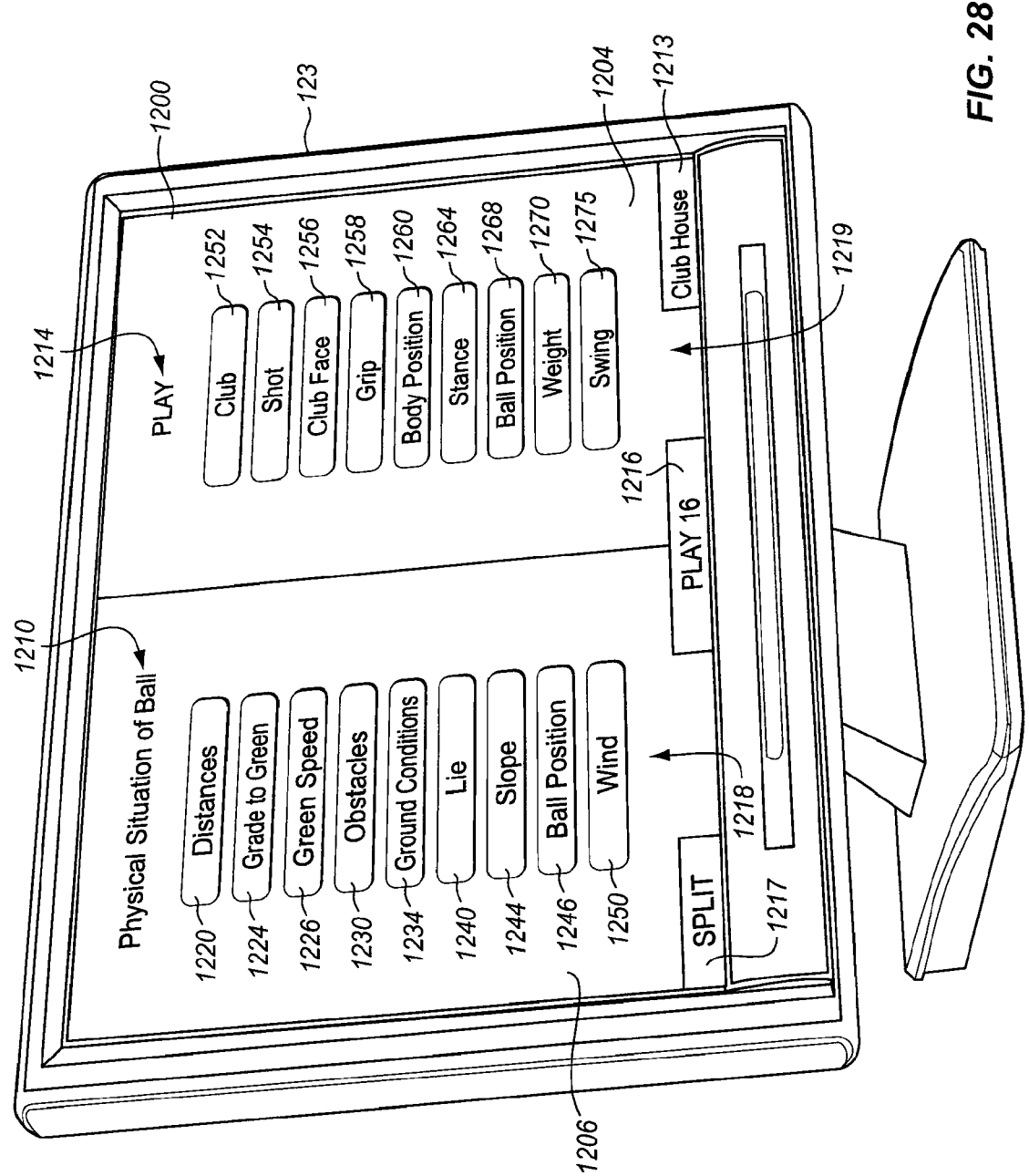
FIG. 28 is an exemplary embodiment of a golf instruction web site or program screen that permits the communication of particular golfing physical situations to the user and permits the entry of actions or play responsive to the physical situation.

FIG. 28 is an exemplary embodiment of a golf instruction web site screen 1200 that permits the communication of particular golfing physical situations 1218 to the user and permits the entry of actions or play items 1219 responsive to the physical situation. That is, this is the split screen to which button 1180 of FIG. 27 links. We shall describe the presentation of the physical situation and the input of the response to the physical situation in connection with this screen. However, if the computer is a cell phone, a laptop, a net book or other computer with a smaller screen, the individual physical factors 1218 and action responses 1219 will be shown in groups or lists that can be scrolled through or otherwise presented in a convenient form. On screen 1200, the physical factors 1218 are listed on one portion 1206 of the screen and the actions or play items 1219 are listed on the other portion 1204 of the screen. The physical factor list 1218 is headed with an appropriate title 1210 and the actions or play item list 1219 is headed with another appropriate title 1214. We note that because breaking down of the game of golf in this manner is new, we have had to invent names for the lists and the items on them, and as the art develops better names may be created. However, it should be understood that the physical factors are the terms that designate particular real-world physical conditions that may exist and must be addressed by the player in a round of golf, and the actions or play items are terms that designate real-world actions, including body, limb and club positions, that a golfer can adjust to make a play in response to the physical factors. Box 1216 reminds the user of the example or physical situation that is being solved, and is also a button that links to a selected actions summary page. If a custom golf ball physical situation has been selected, "Custom" replaces the words "Play 16". Button 1213 is a link back to screen 1150 of FIG. 27. Button 1217 shifts from the split screen shown in FIG. 28, to a screen displaying only either the physical situation factors 1218, as in the left portion 1206 of screen 1200, or the play items 1219, as in the right portion 1204 of screen 1200, depending on which side the cursor is currently placed on, and back to the split screen if only one of the lists is showing.

Each of the physical factors 1218 is a button that provides a link to a screen or screens that describe the particular physical factors. Distance button 1220 links to a screen such as 400 that shows the terrain features 417 and distance 419 to the features. Grade-To-Green button 1224, Green Speed button 1226, Ground Conditions button and wind button 1250 link to a screen, such as 230, that describe these factors, preferably using writing or audio. This screen would be a little different than 230 in that it would show the green and ground conditions as well as the other factors. The green condition is usually speed, and ground conditions relates to wet or dry, soft or hard. The Obstacles button 1230 could also link to a picture showing the obstacle, preferably with something of a familiar size, such as a person or golf cart, next to it, so the size can be judged. Lie button 1240 links to a screen having one or more pictures similar to one or more of pictures 260, 303, and 333 (FIGS. 4-6). Slope button links to a screen having one or more pictures such as pictures 350 (FIG. 7), and Ball Position button 1246 links to a screen having one or more pictures such as pictures 375 (FIG. 8). Preferably, if the screen 1200 is large enough, a plurality of physical factors are shown on one screen, similar to the screen 540.

Figure 29:
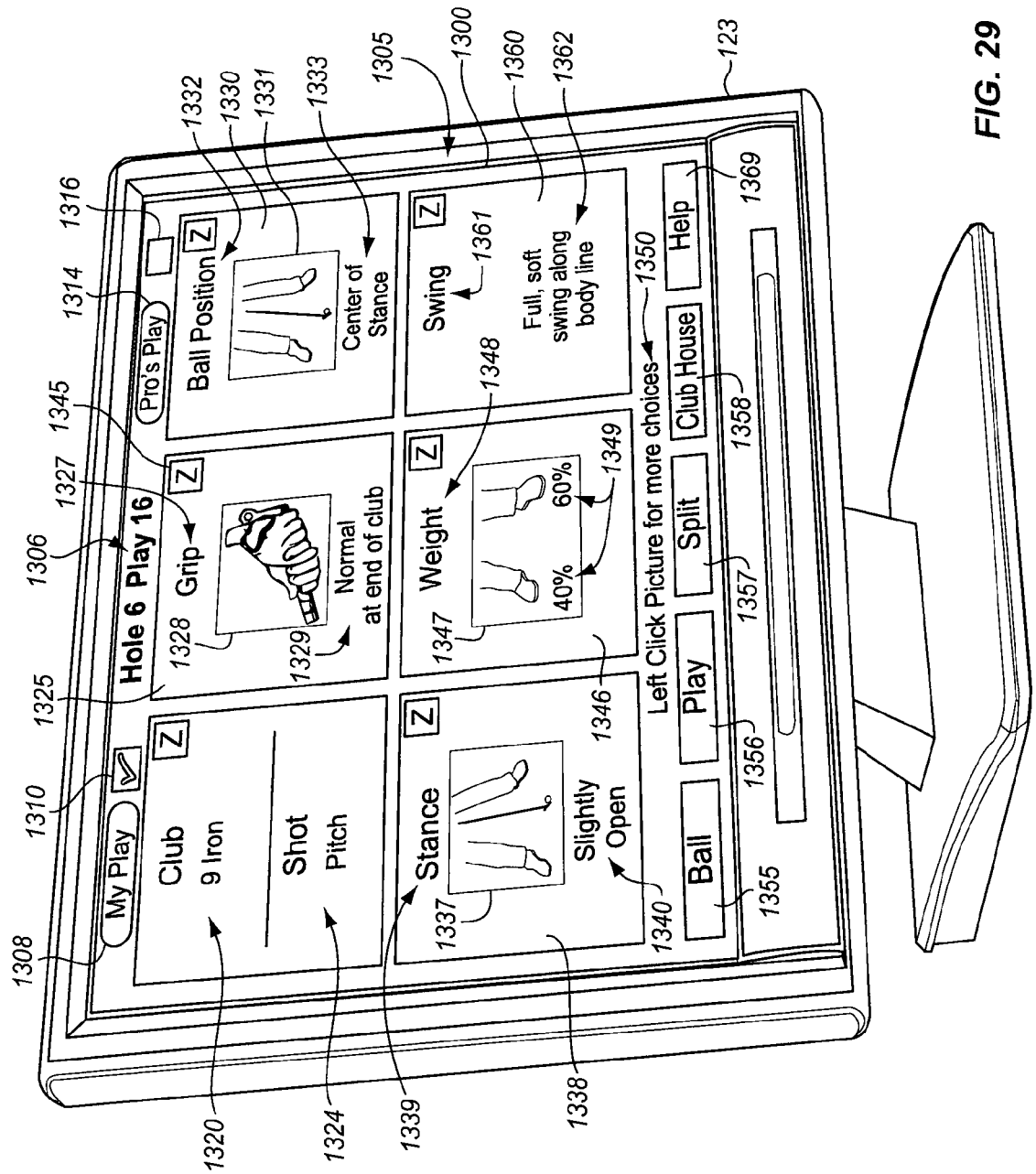
FIG. 29 is an exemplary embodiment of a web site or program screen that illustrates the display of the actions of FIG. 28 responsive to a particular physical situation as they may be entered by a user.

Each of the action or play item buttons 219 links to a screen that permits the user to enter the indicted play item. Each screen preferably presents a plurality of different choices for the play item, and the user selects one of the choices. For example, if the Club button is clicked on, a screen that lists all possible clubs, including woods, irons, and putters is presented, and the user clicks on one of clubs, and that club name, such as 4 iron, replaces the term club on screen 1200. Shot and swing may also be presented in words, though they also may be presented with a short video, with descriptive labels. The Club Face, Grip, Body Position, Stance, Ball Position, and Weight are preferably presented via a plurality of pictures, preferably with labels, one of which the player selects by clicking on it. FIG. 29 is an exemplary embodiment of a play summary screen 1300 that presents a number of such pictures with labels to give an idea of what such pictures may look like. Pictures 1305 illustrate actions or play items of FIG. 28 responsive to a particular physical situation as they may be entered by a user. This play summary screen is reached by clicking on the play button 1216, preferably after all play items 1219 have been selected. Alternatively, a multiple entry screen, such as 1300 may be presented to enable one or more entries to be viewed while the other entries are being selected. The club is indicated in writing at 1320 and the shot (in the narrower sense of drive, pitch, chip, or putt) is indicated in writing at 1324. As indicated at 1350, when "My Play" 1308 is selected, left clicking on club display box 1320 brings up a screen showing other clubs and allowing other choices. Similarly, clicking on shot box 1324 brings up a screen displaying other shots that may be selected. Grip selection box 1325 shows a picture 1328 illustrating the grip selected, a label 1327, and a short written description 1329. Again, when "My Play" 1308 is selected, left clicking on this box 1325 brings up a screen permitting other grips to be selected. Likewise ball position box 1330, shows a picture 1331 of the selected ball position, and includes a label 1332, and a short written description 1333. Stance selection box 1338 includes a picture 1337 of the selected stance, a label 1339, and a short written description of the stance, and weight selection box 1346, shows a picture 1347 illustrating the weight distribution selected, a label 1346 and a short description 1349 of the weight distribution. Swing selection box 1360 includes a label 1361 and a short description 1362 of the swing. Right clicking on this box initiates a short video showing the swing. When "My Play" 1308 is selected, left clicking on any of boxes 1330, 1338, 1346, and 1360 brings up a screen permitting additional selections. When "Pro's Play" 1314 is selected, left clicking on the boxes 1320, 1325, 1330, 1338, 1346 and 1360 brings up a screen showing more detail about the corresponding action that a professional may take. Each box 1320, 1325, 1330, 1338, 1346 and 1360 includes a zoom button, such as 1345, which allows the user to zoon in via a left click on the zoom button or zoom out via a right click on the zoom button. Screen 1300 also includes a legend 1306 that shows the course, the hole and the number of the physical situation. By clicking on button 1314, the illustrations, and descriptions in boxes 1320, 1325, 1330, 1338, 1346 and 1360 change to the actions (play items) suggested by the professional, and by clicking on button 1308 the actions (play items) selected by the user are displayed. A check mark in the box 1310 and a darker appearance of the term "My Play" indicates that the user's selections are displayed, while a check mark in the box 1316 and a darker "Pro's Play indicate that the professional suggestions are displayed. Ball button 1355 switches to the Physical Situation of Ball screen, as in the left portion 1206 of screen 1200, button 1356 links to the Play item screen, as in the right portion 1204 of screen 1200, and split button 1357 links to a screen that shows the users selections side-by-side with the professional suggestions. Club House button 1358 links to the screen 1150 (FIG. 27), and Help button 1369 links to help with the program or web site.

The system of the invention includes merchandizing software that presents opportunities for purchasing golf related merchandize in a polite and unobtrusive manner. The golf pro can also recommend other golf pros if the player needs help with a specific skill or a more advanced coach. The golf pro can also recommend, clubs and other golf equipment as well as clothes, if asked.

A feature of the invention is that it assists players in getting excellent assistance from a golf pro, or, in the gaming embodiments, allows a user to gain experience that is actually applicable to playing golf or other sports. There are many products on the market that call themselves "golf caddies", or by similar terms, but none of them actually provide a fraction of the assistance that a real living caddy provides. The only information they provide is the distance to various targets, and, if the system has been programmed extensively by the user, the club that should be used. Devices that provide club selection information have been available for a hundred years. As one simple example, a feature of the invention is that it provides the altitude of the golf course to the professional that is doing the coaching, in the systems that teaches the judgmental aspects, and in the range finder according to the invention. The distance a golf ball travels is as much dependent on the altitude of the course as well as whether one uses an eight iron or a nine iron. Yet, no previous "golf caddy" systems have provided this information.

Another feature of the invention is that it provides easily understandable communications with a pro, or in the gaming embodiment, with the user, regarding al factors important to the decision on what shot to make. For example, the grade, the slope or the ball position, all off which must be accurately reflected in judgmental decisions of the advice or practice, are all easily communicated.

There has been described a personal coaching system for assisting a user in learning the strategic and judgmental aspects of a sport, and having numerous novel features. In just one aspect, we have described a sport call center herein. However, many other features have been described which support the learning of the judgmental aspects of a sport. It should be understood that the particular embodiments described within this specification are for purposes of example and should not be construed to limit the invention. It is evident that the various parts of the different embodiments described may be combined with each other, process steps may occur in a different order from that shown, or combined in a different manner, and additional features often found in software applications and web sites may be added. Any of the specific features, processes or embodiments of the invention can be combined with any other of the specific features, processes or embodiments. Further, it is evident that those skilled in the art may now make numerous uses and modifications of the specific embodiment described, without departing from the inventive concepts. Equivalent structures and processes may be substituted for the various structures and processes described or a variety of different electronic elements may be used. Consequently, the invention is to be construed as embracing each and every novel feature and novel combination of features present in and/or possessed by the personal coaching apparatus and methods described.

I claim:

1. A method for coaching a player in judgmental aspects of golf or for practicing said judgmental aspects of golf, said method comprising:
providing a client computer having a first display;
providing a professional computer remote from said client computer, said professional computer having a second display;
providing a communication process for communicating a lie of the golf ball, said communication process comprising:
displaying a plurality of pictures on said first display, each of said pictures showing a different physical situation of a golf ball that may occur in golf and are pre-stored in a course database, said pictures including one or more pictures illustrating a possible terrain on which a golf ball may lie, said pictures being displayed simultaneously as a set of pictures and at least one of said pictures being sufficiently close up that a viewer can determine if the ball is embedded in said terrain;
receiving an input indicating that said player has selected one of said pictures to describe a golf ball physical situation with respect to which said player wants coaching;
said method for coaching further comprising:
receiving additional inputs describing said golf ball physical situation, including distance information and location coordinates of the location of the client computer, sufficient to provide coaching related to said golf ball physical situation;
displaying said selected picture and said additional inputs on said second display; and
providing coaching to said player relating to said golf ball physical situation shown in said selected picture, said coaching comprising review of said selected picture and additional inputs by an expert in the sport of golf; and communicating said coaching to said player by said expert.

2. A method as in claim 1 wherein:
said client computer includes a range finder system and said receiving additional inputs comprises using said range finder system to generate an overhead view of a golf course hole showing distances from said golf ball to predetermined terrain features of said golf course hole;
said displaying on said second display comprises displaying said overhead view of said golf course hole with distances on said second display; and
said providing coaching comprises providing said coaching based on said overhead view as well as said golf ball physical situation shown in said picture.

3. A method as in claim 2 wherein said displaying a plurality of pictures and said receiving an input are repeated a plurality of times and each time a different set of pictures is displayed.

4. A method as in claim 3 wherein said plurality of pictures are selected from picture sets illustrating the lie of a golf ball, the slope of the course in the direction of the intended line of flight at the position of a golf ball, or the ball position uphill or downhill of the player along a line substantially perpendicular to the plane of the player's body.

5. A method as in claim 1 wherein said displaying a plurality of pictures comprises:
displaying pictures selected from the group consisting of:
pictures showing the lie of a golf ball, each of said pictures showing a different lie that may occur on a golf course, wherein "lie" means the type of terrain on which the ball lies or in the immediate surroundings of the ball, including fairway, rough, sand, mud, water, gravel;
pictures showing the slope of the course in the direction of the intended line of flight at the position of a golf ball, each of said pictures showing a different such slope that may occur on a golf course; and
pictures showing the ball position uphill or downhill of the player along a direction substantially perpendicular to the plane of the player's body from left to right, each of said pictures showing a different such ball position that may occur on a golf course.

6. A method as in claim 1 wherein said client computer has a camera associated with it, and comprises taking a picture of a golf ball in a physical situation with said camera.

7. A method as in claim 1 wherein said client computer includes a range finder system associated with it, and said selecting a plurality of pictures comprises, using said range finder system, generating an overhead view of a golf course hole showing distances from said golf ball to predetermined terrain features of said golf course hole, and wherein said transmitting and displaying comprises transmitting and displaying said overhead view of said golf course hole.

8. A method as in claim 1 wherein:

said providing a golf professional computer comprises providing a plurality of said golf professional computers, each having a display;

said method further comprises providing a golf call center server computer; and said transmitting comprises, using said golf call center computer, choosing one of said golf professional computers to which to transmit said pictures.

* * * * *